(12) United States Patent
Sunder et al.

(10) Patent No.: US 9,630,123 B2
(45) Date of Patent: Apr. 25, 2017

(54) LIQUID DISTRIBUTOR WITH A MIXER

(75) Inventors: Swaminathan Sunder, Allentown, PA (US); Donn Michael Herron, Fogelsville, PA (US); Patrick Alan Houghton, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 668 days.

(21) Appl. No.: 13/328,009

(22) Filed: Dec. 16, 2011

(65) Prior Publication Data

US 2013/0153037 A1   Jun. 20, 2013

(51) Int. Cl.
| | | |
|---|---|---|
| *B01F 3/04* | (2006.01) | |
| *B01D 3/00* | (2006.01) | |
| *B01D 3/20* | (2006.01) | |
| *F25J 3/04* | (2006.01) | |

(52) U.S. Cl.
CPC .............. *B01D 3/008* (2013.01); *B01D 3/20* (2013.01); *F25J 3/04848* (2013.01); *F25J 3/04927* (2013.01); *F25J 2290/10* (2013.01); *Y10T 29/49826* (2015.01); *Y10T 137/0318* (2015.04)

(58) Field of Classification Search
CPC .... F25J 3/04896; F25J 3/04927; B01D 3/008; B01D 53/185
USPC .............................. 62/905, 906, 643; 261/97
See application file for complete search history.

(56) References Cited

U.S. PATENT DOCUMENTS

| | | | |
|---|---|---|---|
| 2,804,292 A | 8/1957 | Schilling | |
| 4,087,252 A | 5/1978 | Strahorn et al. | |
| 4,308,105 A * | 12/1981 | Schiffers | G21F 9/08 159/6.1 |
| 4,565,216 A * | 1/1986 | Meier | B01D 3/008 137/561 A |
| 4,776,989 A | 10/1988 | Harper et al. | |
| 5,158,713 A | 10/1992 | Ghelfi et al. | |
| 5,240,652 A | 8/1993 | Taylor et al. | |
| 5,381,839 A | 1/1995 | Dowd et al. | |

(Continued)

FOREIGN PATENT DOCUMENTS

| | | |
|---|---|---|
| CN | 1282266 A | 1/2001 |
| CN | 1606471 A | 4/2005 |

(Continued)

OTHER PUBLICATIONS

DE1116380 Translation.*

*Primary Examiner* — Frantz Jules
*Assistant Examiner* — Brian King
(74) *Attorney, Agent, or Firm* — Eric J. Schaal

(57) ABSTRACT

An apparatus for distributing a flow of a liquid descending in an inner space of a packed column includes: a collector to collect the flow of the liquid; a mixer below and vertically spaced apart from the collector to receive and mix the liquid collected; a first conduit to receive and transmit at least part of the liquid from a first sector of the collector to a first zone of the mixer; and a second conduit to receive and transmit at least part of the liquid from a second sector of the collector to a second zone of the mixer. A geometric center of the first sector of the collector is positioned circumferentially away from a geometric center of the first zone of the mixer and/or a geometric center of the collector's second sector is positioned circumferentially away from a geometric center of the mixer's second zone.

15 Claims, 12 Drawing Sheets

(56) References Cited

U.S. PATENT DOCUMENTS

| | | | |
|---|---|---|---|
| 5,554,346 A * | 9/1996 | Perry | B01D 3/20 |
| | | | 261/97 |
| 5,752,538 A | 5/1998 | Billingham et al. | |
| 5,776,316 A | 7/1998 | Potthoff et al. | |
| 5,857,589 A | 1/1999 | Cline et al. | |
| 5,897,748 A | 4/1999 | Kaibel | |
| 5,919,405 A | 7/1999 | Menon et al. | |
| 5,935,389 A | 8/1999 | Hine et al. | |
| 6,086,055 A | 7/2000 | Armstrong et al. | |
| 6,338,774 B1 * | 1/2002 | Lehman | B01D 3/008 |
| | | | 159/3 |
| 7,007,932 B2 | 3/2006 | Armstrong et al. | |
| 7,114,709 B2 | 10/2006 | Ender et al. | |
| 2002/0079597 A1 * | 6/2002 | Bartlok | B01D 3/008 |
| | | | 261/97 |
| 2005/0035473 A1 | 2/2005 | Manteufel | |
| 2009/0049864 A1 | 2/2009 | Kovak et al. | |
| 2011/0023542 A1 * | 2/2011 | Leclercq | B01J 19/32 |
| | | | 62/643 |

FOREIGN PATENT DOCUMENTS

| | | | |
|---|---|---|---|
| DE | 11 13 680 B | | 9/1961 |
| DE | 1113680 | * | 9/1961 |
| EP | 1 323 467 A1 | | 7/2003 |
| JP | H06-500264 | | 1/1994 |
| JP | 2000227275 | | 8/2000 |
| RU | 2382963 | | 2/2010 |
| TW | 382615 | | 2/2000 |

\* cited by examiner

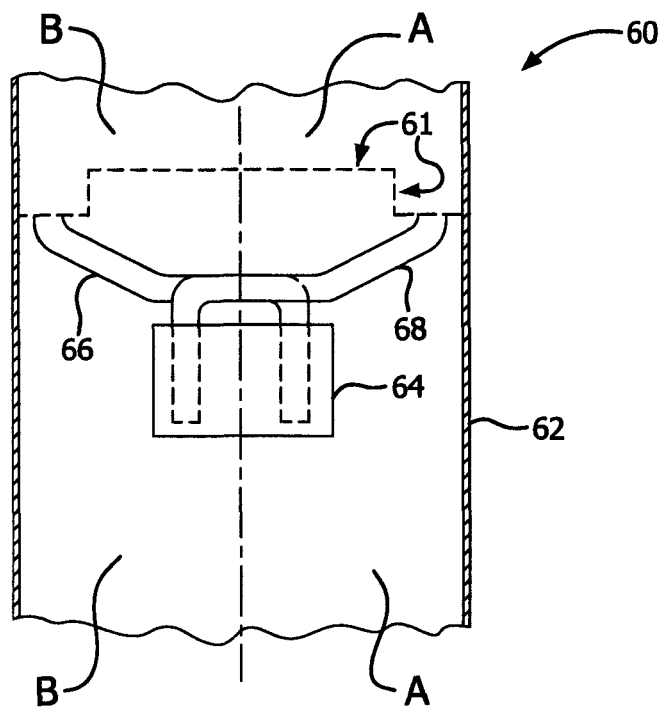
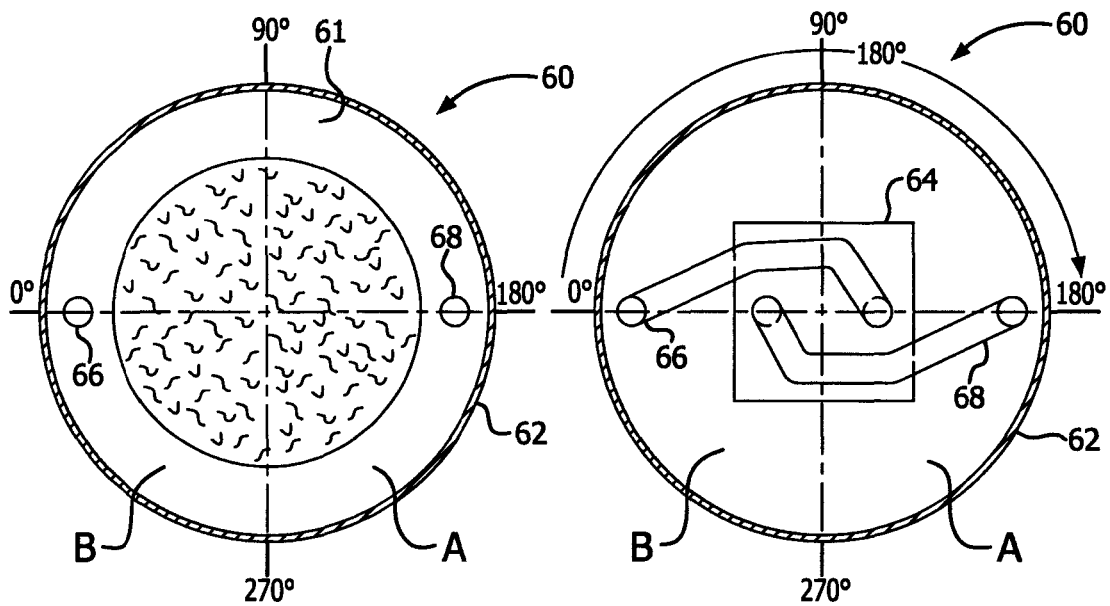
FIG. 2A
FIG. 2B
FIG. 2C

LIQUID DISTRIBUTOR WITH A MIXER

BACKGROUND

Applicants' apparatus and methods relate to devices and methods for mixing and distributing liquid descending in exchange columns for heat and/or mass transfer processes. The apparatus and methods have particular application in cryogenic air separation processes utilizing distillation, although the apparatus and methods also may be used in other heat and/or mass transfer processes that use packing (e.g., random or structured packing). Applicants' methods also relate to methods for assembling devices for mixing and distributing liquid descending in exchange columns.

As used herein, the term "column" (or "exchange column") means a distillation or fractionation column i.e., a column where liquid and vapor phases are countercurrently contacted to effect separation of a fluid mixture, such as by contacting of the vapor and liquid phases on packing elements (in a "packed column") or on a series of vertically-spaced trays or plates mounted within the column.

Cryogenic separation of air is carried out in distillation columns wherein liquid and vapor mixtures are brought into intimate contact with each other. In each distillation column a vapor phase of the mixture ascends with an ever increasing concentration of the more volatile components (e.g., nitrogen) while a liquid phase of the mixture descends with an ever increasing concentration of the less volatile components (e.g., oxygen). Various means, such as packings or trays, may be used to bring the liquid and vapor phases of the mixture into contact to accomplish mass transfer between the phases.

There are many process cycles for the cryogenic separation of air into its main components, namely nitrogen, oxygen, and argon. A typical process known as the double column cycle is shown schematically in FIG. 1. Only the distillation columns and the associated cryogenic heat exchangers are shown in this schematic illustration for brevity. The double column cycle includes a high pressure column 10, a low pressure column 12, an argon column 14, a main reboiler condenser 16, a sub-cooler 18, an argon condenser 20, and an argon condenser can 22.

High pressure feed air 24 at about 4.5-5.5 bara pressure and near its dew point is fed into the base of the high pressure column 10. Within the high pressure column 10, the air is separated into nitrogen-enriched vapor 26 and oxygen-enriched liquid 28. The oxygen-enriched liquid 28 is sub-cooled in the sub-cooler 18, let down in pressure to about 1.2-1.4 bara and fed into the argon condenser can 22. The nitrogen-enriched vapor 26 is passed into the main reboiler-condenser 16 where it is condensed against boiling oxygen, which provides boilup to the low pressure column 12. The condensed nitrogen-enriched liquid 30 is partly used as reflux 32 for the high pressure column 10 and partly used as reflux 34 for the low pressure column 12 after subcooling the latter in sub-cooler 18 and letting it down in pressure to about 1.2-1.4 bara. In the low pressure column 12, the various feeds are separated by cryogenic distillation into oxygen-rich and nitrogen-rich components.

Gaseous oxygen product 35, also known as GOX, is withdrawn from the bottom of the low pressure column 12 and gaseous nitrogen product 36, also known as LPGAN, is withdrawn from the top of the low pressure column 12 and warmed through the sub-cooler 18 before being fed to other parts of the plant. A waste stream 38 is also withdrawn from an intermediate location in the low pressure column 12, warmed through the sub-cooler 18 and fed to other parts of the plant.

A vapor phase side-stream 40 is withdrawn from another intermediate location in the low pressure column 12 and fed to the bottom of the argon column 14 where, after flowing up the argon column 14 and condensing, it returns as a liquid stream 42, which is fed back into the low pressure column 12. The refrigeration for the argon condenser 20 is provided by partial evaporation of stream 28 in the argon condenser can 22, from where it is fed partly as vapor 46 and partly as liquid 48 to the low pressure column. Part of the vapor at the top of the argon column 14 is withdrawn as crude argon 50, also known as CGAR, and fed to other parts of the plant for further processing.

In each of the distillation columns, separation is accomplished in one or more sections, such as section 11 in the high pressure column 10, sections 13, 15, 17, 19, and 21 in the low pressure column 12, and sections 23 and 25 in the argon column 14. While different types of contact means, such as trays or packing, may be used, in the Examples discussed by Applicants, the contact means are all assumed to be made of structured packing and are shown as such.

There are many devices for distributing liquid flow uniformly over a packed section of a packed column. Such devices are disclosed in various patents and textbooks. For example, there are trough-style distributors with multiple parallel regions wherein liquid collects and flows through an array of perforations to the packing below. The liquid troughs may be laid out uniformly over the column cross section and may be fed by a central channel that runs perpendicular to the troughs and which itself may cover a major portion of the column diameter. In large columns, the liquid troughs also may be connected near the wall through an annular gutter, which may be a means for equalizing hydraulic gradients. Vapor flows in parallel regions in between the liquid troughs in generally rectangular risers. The vapor regions may have caps placed over them to prevent the liquid from the section above from falling through them and instead to channel the liquid into the troughs which collect and convey the liquid to the column section below. Such distributors may be referred to as chimney style distributors. There also are pan style distributors wherein vapor risers may be generally circular in cross section and the liquid flows around them and through perforations to the packing below. Thus, there are many basic designs and numerous variations on the basic design.

Initial presentation of liquid and vapor to the packing in a column is made by such distributors. A liquid distributor, the role of which is to irrigate the packing substantially uniformly with liquid, is located above the packing, while a vapor distributor, the role of which is to create substantially uniform vapor flow below the packing, is located below the packing. In addition to the vapor distributor, a liquid collector also is located below the packing, the role of which is to collect the liquid leaving the packing and direct the liquid further down the column. It is common for the liquid collector and the vapor distributor to be encompassed in the same device, which performs both roles.

Traditionally, there have only been a few distributors that have dealt with mixing, either independently or in combination with liquid flow distribution. These devices do not perform well in terms of their liquid composition and flow distribution quality, especially for large cryogenic distillation columns of an air separation plant having diameters greater than about 2 meters, because the devices do not provide for complete mixing (but rather only partial mixing)

and uniform distribution of liquid to a packed column to achieve high separation efficiency, as do Applicants' apparatus and method. The reliability of packed columns also is improved by Applicants' apparatus and methods, which protect the packed columns from manufacturing debris and operating debris by using filters.

Various types of devices have been used in packed columns or mass transfer columns, where such devices perform, at least in part, one or more of the following functions with respect to liquid descending in a column: collection, distribution, redistribution, and mixing. However, for various reasons, these devices do not completely mix the liquid and therefore do not provide uniformity in both flow and composition of the liquid. For example, such devices are disclosed in U.S. Pat. No. 5,158,713 (Ghelfi, et al.); U.S. Pat. No. 5,776,316 (Potthoff, et al.); U.S. Pat. No. 5,752,538 (Billingham, et al.); U.S. Pat. No. 5,935,389 (Hine, et al.); and U.S. Pat. No. 7,114,709 (Ender, et al.). See also the liquid collector and redistributor disclosed in U.S. Pat. App. Pub. No. US 2009/0049864 (Kovak, et al.). Other examples of such devices include the devices disclosed in U.S. Pat. No. 5,240,652 (Taylor, et al.); U.S. Pat. No. 5,897,748 (Kaibel); U.S. Pat. No. 6,086,055 (Armstrong, et al.); and U.S. Pat. No. 7,007,932 (Armstrong, et al.).

BRIEF SUMMARY

There are various aspects of Applicants' apparatus and methods, and many variations of each aspect.

One aspect is an apparatus for distributing a flow of a liquid descending in an inner space of a packed column. The apparatus includes a collector, a mixer, a first conduit, and a second conduit. The collector has a plurality of sectors disposed in the inner space of the packed column and is adapted to collect at least a portion of the flow of the liquid descending in the inner space of the packed column. The mixer is below and vertically spaced apart from the collector in the inner space of the packed column. The mixer has a plurality of zones disposed in the inner space of the packed column and is adapted to receive and mix at least a portion of the liquid collected on the collector. The first conduit has a first end in fluid communication with a first sector of the collector and a second end in fluid communication with a first zone of the mixer. The first conduit is adapted to receive and transmit downward at least a portion of the liquid from the first sector of the collector to the first zone of the mixer. The second conduit has a first end in fluid communication with a second sector of the collector and a second end in fluid communication with a second zone of the mixer. The second conduit is adapted to receive and transmit downward at least a portion of the liquid from the second sector of the collector to the second zone of the mixer. At least one of a geometric center of the first sector of the collector is positioned circumferentially away from a geometric center of the first zone of the mixer and a geometric center of the second sector of the collector is positioned circumferentially away from a geometric center of the second zone of the mixer.

In a first variation of the apparatus, the geometric center of the first sector of the collector is positioned circumferentially away from the geometric center of the first zone of the mixer by about 60° to about 180°, and preferably by about 120° to about 180°, and most preferably by about 180°.

In a variation of the first variation of the apparatus, the geometric center of the second sector of the collector is positioned circumferentially away from the geometric center of the second zone of the mixer by about 60° to about 180°, and preferably about 120° to about 180°, and most preferably by about 180°.

In another variation of any of the apparatus discussed in the previous three paragraphs, a cross-sectional area of the mixer occupies no more than about 25%, and preferably no more than about 20%, of a cross-sectional area of the inner space of the packed column.

A second apparatus is similar to the first apparatus or any of the variations discussed above, but also includes a predistributor. The predistributor is disposed in the inner space of the packed column and is adapted to receive at least a portion of a flow of a mixed liquid from the mixer and to transmit at least a part of the received flow of the mixed liquid outwardly from the predistributor.

A third apparatus is similar to the second apparatus or any of the variations discussed above, but also includes a final distributor. The final distributor is disclosed in the inner space of the packed column and is adapted to receive at least a portion of a flow of a predistributed liquid from the predistributor and to transmit at least a portion of the received flow of the predistributed liquid substantially uniformly over at least a portion of a cross-sectional area of the inner space of the packed column.

In a variation of the third apparatus, the predistributor includes a plurality of channels adapted to transmit downward at least part of the received flow of the mixed liquid. In addition, the final distributor includes a plurality of troughs adapted to transmit at least part of the flow of the predistributed liquid. Each trough has at least one aperture and is in fluid communication with at least one channel of the predistributor.

A fourth apparatus is similar to the first, second, or third apparatus or any of the variations thereof discussed above, but also includes a filter. In a variation of any of those apparatus or variations thereof, the filter is disposed in the mixer.

Another aspect is a method for distributing a flow of a liquid descending in an inner space of a packed column, which method includes nine steps. The first step is to provide a collector having a plurality of sectors disposed in the inner space of the packed column and adapted to collect at least a portion of the flow of the liquid descending in the inner space of the packed column. The second step is to provide a mixer below and vertically spaced apart from the collector in the inner space of the packed column, the mixer having a plurality of zones disposed in the inner space of the packed column and adapted to receive and mix at least a portion of the liquid collected on the collector. The third step is to provide a first conduit having a first end in fluid communication with a first sector of the collector and a second end in fluid communication with a first zone of the mixer, the first conduit adapted to receive and transmit downward at least a portion of the liquid from the first sector of the collector to the first zone of the mixer. A fourth step is to provide a second conduit having a first end in fluid communication with a second sector of the collector and a second end in fluid communication with a second zone of the mixer, the second conduit adapted to receive and transmit downward at least a portion of the liquid from the second sector of the collector to the second zone of the mixer. At least one of a geometric center of the first sector of the collector is positioned circumferentially away from a geometric center of the first zone of the mixer and a geometric center of the second sector of the collector is positioned circumferentially away from a geometric center of the second zone of the mixer. A fifth step is to introduce into the inner space of the packed column above the collector the flow of the liquid descending in the inner space of the packed column. A sixth step is to collect on the collector at least a portion of the flow of the liquid descending in the inner space of the packed column. A seventh step is to transmit downward through the first conduit at least a portion of the liquid from the first sector of the collector to the first zone of the mixer. The eighth step is to transmit downward through the second conduit at least a portion of the liquid from the second sector of the collector to the second zone of the mixer. The ninth step is to mix in the mixer the liquid transmitted to the first zone of the mixer from the first sector of the collector with the liquid transmitted to the second zone of the mixer from the second sector of the collector, thereby producing a mixed liquid.

In a first variation of the method, the geometric center of the first sector of the collector is positioned circumferentially away from the geometric center of the first zone of the mixer by about 60° to about 180°, and preferably by about 120° to about 180°, and most preferably by about 180°.

In a variation of the first variation of the method, the geometric center of the second sector of the collector is positioned circumferentially away from the geometric center of the second zone of the mixer by about 60° to about 180°, and preferably by about 120° to about 180°, and most preferably by about 180°.

In another variation of any of the methods discussed in the previous three paragraphs, a cross-sectional area of the mixer occupies no more than about 25%, and preferably no more than about 20%, of a cross-sectional area of the inner space of the packed column.

A second method is similar to the first method or any of the variations discussed above, but includes three additional steps. The first additional step is to provide a predistributor disposed in the inner space of the packed column and adapted to receive at least a portion of a flow of a mixed liquid from the mixer and to transmit at least a part of the received flow of the mixed liquid outwardly from the predistributor. The second additional step is to transmit from the mixer to the predistributor at least a portion of the flow of the mixed liquid. The third additional step is to transmit outwardly from the predistributor at least a part of the received flow of the mixed liquid received from the mixer.

A third method is similar to the second method or any of the variations discussed above, but includes three further additional steps. The first further additional step is to provide a final distributor disposed in the inner space of the packed column and adapted to receive at least a portion of a flow of a predistributed liquid from the predistributor and to transmit at least a portion of the received flow of the predistributed liquid substantially uniformly over at least a portion of a cross-sectional area of the inner space of the packed column. The second further additional step is to receive by the final distributor at least a portion of the flow of the predistributed liquid from the predistributor. The third further additional step is to transmit at least a portion of the received flow of the predistributed liquid substantially uniformly over at least a portion of the cross-sectional area of the inner space of the packed column.

In a variation of the third method, the predistributor includes a plurality of channels adapted to transmit downward at least part of the received flow of the mixed liquid. In addition, the final distributor includes a plurality of troughs adapted to transmit at least part of the flow of the predistributed liquid, each trough having at least one aperture and being in fluid communication with at least one channel of the predistributor.

A fourth method is similar to the first, second, or third method or any variation thereof discussed above, but includes two additional steps. The first additional step is to provide a filter. The second additional step is to filter at least a portion of the liquid. In a variation of any of those methods or variations thereof, the filter is disposed in the mixer.

Yet another aspect is a method for assembling an apparatus for distributing a flow of a liquid descending in an inner space of a packed column, which method for assembling includes five steps. The first step is to provide the packed column having the inner space. The second step is to provide in the inner space of the packed column a collector having a plurality of sectors and adapted to collect at least a portion of the flow of the liquid descending in the inner space of the packed column. The third step is to provide in the inner space of the packed column a mixer below and vertically spaced apart from the collector, the mixer having a plurality of zones disposed in the inner space of the packed column and adapted to receive and mix at least a portion of the liquid collected on the collector. The fourth step is to provide a first conduit having a first end in fluid communication with a first sector of the collector and a second end in fluid communication with a first zone of the mixer, the first conduit adapted to receive and transmit downward at least a portion of the liquid from the first sector of the collector to the first zone of the mixer. The fifth step is to provide a second conduit having a first end in fluid communication with a second sector of the collector and a second end in fluid communication with a second zone of the mixer, the second conduit adapted to receive and transmit downward at least a portion of the liquid from the second sector of the collector to the second zone of the mixer. At least one of a geometric center of the first sector of the collector is positioned circumferentially away from a geometric center of the first zone of the mixer and a geometric center of the second sector of the collector is positioned circumferentially away from a geometric center of the second zone of the mixer.

In a first variation of the method for assembling, the geometric center of the first sector of the collector is positioned circumferentially away from the geometric center of the first zone of the mixer by about 60° to about 180°, and preferably by about 120° to about 180°, and most preferably by about 180°.

In a variation of the first variation of the method for assembling, the geometric center of the second sector of the collector is positioned circumferentially away from the geometric center of the second zone of the mixer by about 60° to about 180°, and preferably by about 120° to about 180°, and most preferably by about 180°.

In another variation of any of the methods for assembling discussed in the three previous paragraphs, a cross-sectional area of the mixer occupies no more than about 25%, and preferably no more than about 20%, of a cross-sectional area of the inner space of the packed column.

A second method for assembling an apparatus is similar to the first method for assembling or any of the variations discussed above, but includes a further step. The further step is to provide in the inner space of the packed column a predistributor adapted to receive at least a portion of a flow of a mixed liquid from the mixer and to transmit at least a part of the received flow of the mixed liquid outwardly from the predistributor.

A third method for assembling an apparatus is similar to the second method for assembling or any of the variations discussed above, but includes another further step. The another further step is to provide in the inner space of the packed column a final distributor adapted to receive at least a portion of the flow of a predistributed liquid from the predistributor and to transmit at least a portion of the received flow of the predistributed liquid substantially uniformly over at least a portion of a cross-sectional area of the inner space of the packed column.

In a variation of the third method for assembling, the predistributor includes a plurality of channels adapted to transmit downward at least part of the received flow of the mixed liquid. In addition, the final distributor includes a plurality of troughs adapted to transmit at least part of the flow of the predistributed liquid, each trough having at least one aperture and being in fluid communication with at least one channel of the predistributor.

A fourth method for assembling an apparatus is similar to the first, second, or third methods for assembling or any variations thereof discussed above, but includes the further step of providing a filter. In a variation of any of those methods for assembling or variations thereof, the filter is disposed in the mixer.

Another aspect is a process for cryogenic air separation, which includes contacting an ascending vapor and a descending liquid counter-currently in a packed column having an inner space with a first mass transfer section in the inner space and a second mass transfer section below and spaced apart from the first mass transfer section in the inner space. In this process, an apparatus, such as any of the apparatus discussed above, or any variations thereof, is positioned between the first mass transfer section and the second mass transfer section, and distributes a flow of the descending liquid from the first mass transfer section to the second mass transfer section.

Yet another aspect is a method for distributing a flow of a liquid descending in an inner space of a packed column, which method includes five steps. The first step is to introduce into the inner space of the packed column above a collector disposed in the inner space the flow of the liquid descending in the inner space of the packed column. The second step is to collect on the collector at least a portion of the flow of the liquid descending in the inner space of the packed column. The third step is to transmit downward through a first conduit in fluid communication with the collector at least a portion of the liquid from a first sector of the collector to a first zone of the mixer disposed in the inner space below and spaced apart from the collector, whereby the liquid transmitted through the first conduit is circumferentially transposed from the first sector of the collector to first zone of the mixer. The fourth step is to transmit downward through a second conduit in fluid communication with the collector at least a portion of the liquid from a second sector of the collector to a second zone of the mixer, whereby the liquid transmitted by the second conduit is circumferentially transposed from the second sector of the collector to the second zone of the mixer. The fifth step is to mix in the mixer the liquid transmitted to the first zone of the mixer from the first sector of the collector with the liquid transmitted to the second zone of the mixer from the second sector of the collector, thereby producing a mixed liquid.

In a first variation of this method, the liquid transmitted through the first conduit is circumferentially transposed from the first sector of the collector to the first zone of the mixer by about 60° to about 180°, preferably by about 120° to about 180°, and most preferably by about 180°.

In a variation of the first variation of this method, the liquid transmitted through the second conduit is circumferentially transposed from the second sector of the collector to the second zone of the mixer by about 60° to about 180°, and preferably by about 120° to about 180°, and most preferably by about 180°.

In another variation of any of the methods discussed in the previous three paragraphs, a cross-sectional area of the mixer occupies no more than about 25%, and preferably no more than about 20%, of a cross-sectional area of the inner space of the packed column.

A second method is similar to the first method (described in the previous four paragraphs) or any of the variations thereof discussed above, but includes two additional steps. The first additional step is to transmit from the mixer to a predistributor disposed in the inner space of the packed column at least a portion of the flow of the mixed liquid. The second additional step is to transmit outwardly from the predistributor at least the part of the received flow of the mixed liquid received from the mixer.

A third method is similar to the second method in the previous paragraph or any of the variations thereof discussed above, but includes two further additional steps. The first further additional step is to receive by a final distributor disposed in the inner space of the packed column at least a portion of the flow of the predistributed liquid from the predistributor. The second further additional step is to transmit at least a portion of the received flow of the predistributed liquid substantially uniformly over at least a portion of the cross-sectional area of the inner space of the packed column.

In a variation of the third method in the above paragraph, the predistributor includes a plurality of channels adapted to transmit downward at least part of the received flow of the mixed liquid. In addition, the final distributor includes a plurality of troughs adapted to transmit at least part of the flow of the predistributed liquid, each trough having at least one aperture and being in fluid communication with at least one channel of the predistributor.

A fourth method is similar to the first, second, or third methods or any variations thereof discussed above in the previous seven paragraphs, but includes two additional steps. The first additional step is to provide a filter. The second additional step is to filter at least a portion of the liquid. In a variation of any of those methods or variations thereof, the filter is disposed in the mixer.

BRIEF DESCRIPTION OF THE DRAWINGS

Applicants' apparatus and methods will be described by way of example with reference to the accompanying drawings, in which:

FIG. 2A is a schematic diagram of a cross-sectional elevational view for one embodiment of Applicants' apparatus;

FIG. 2B is a schematic diagram of a cross-sectional plan view illustrating one type of collector with conduit inlets of one embodiment of Applicants' apparatus;

FIG. 2C is a schematic diagram of another cross-sectional plan view illustrating a mixer and one arrangement of conduits of one embodiment of Applicants' apparatus;

DETAILED DESCRIPTION

Figure 1:
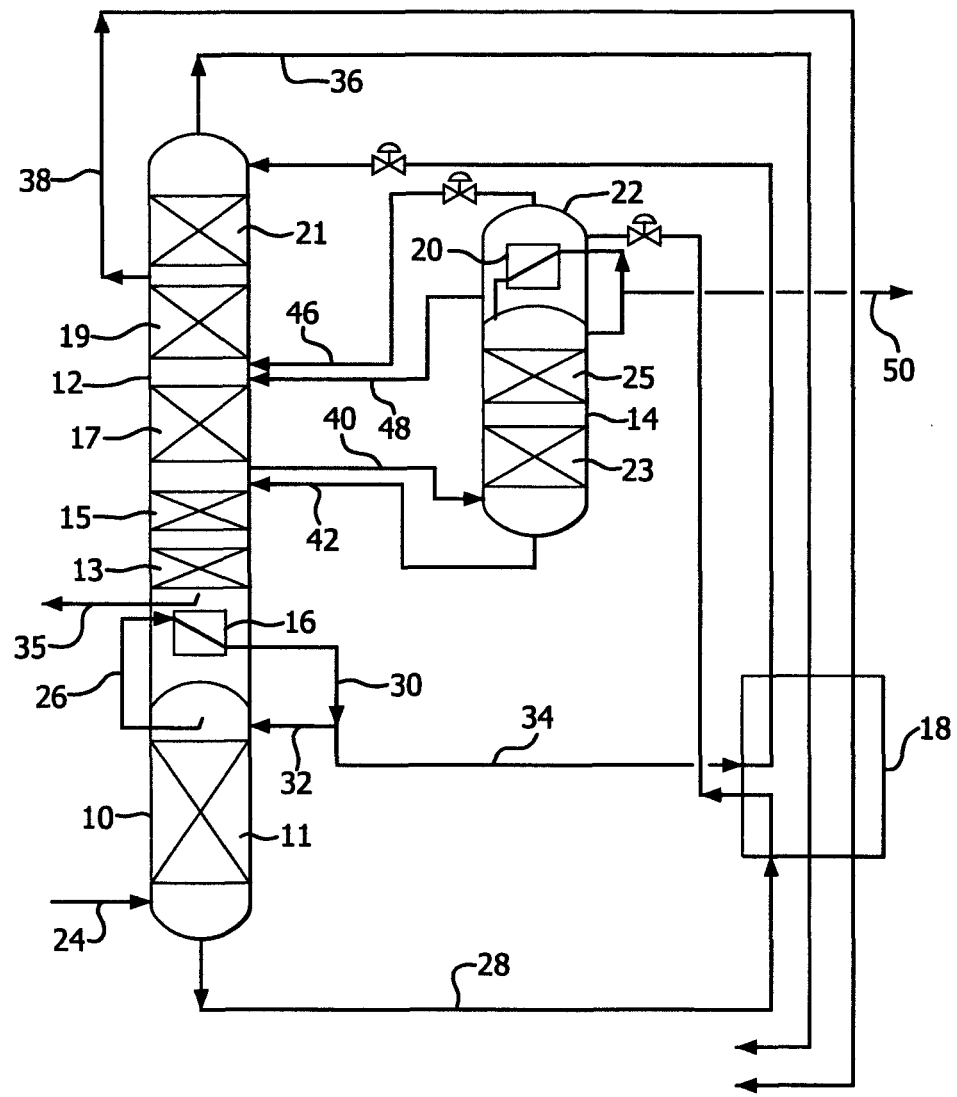
FIG. 1 is a schematic diagram of a typical double column cycle for cryogenic separation of air.

Applicants' apparatus and methods mix and distribute a liquid descending in a column uniformly over the cross sectional area of a packed section in the column. The apparatus includes a collector, a mixer, a predistributor to spread the liquid outwardly from the mixer, and a final distributor to deposit the liquid uniformly over the cross sectional area of the packed section in the column. An embodiment of the apparatus also includes means (e.g., conduits arranged in certain ways described herein) to compensate for any inadequacy of mixing that may occur within the mixer. Optionally, the apparatus may include a filter through which at least some of the liquid may flow in order to protect a packed column from process debris and manufacturing debris. If liquid feeds external to the column are to be introduced to a packed section below, such feeds may be suitably introduced into the mixer after disengaging such liquid from any vapor that may be present therein.

The performance of a packed column depends on the quality of liquid and vapor distribution, which include uniformity in both the flow and composition of the two phases entering and across the cross section of the column. Different sections of a packed column exhibit different levels of sensitivity to maldistribution depending on the relationship between their equilibrium and operating lines. While the importance of flow uniformity is well understood in the literature, composition effects are less well understood. For sensitive sections it is presumed to be important to mix all or substantially all of the incoming liquid and then redistribute the liquid substantially uniformly across the cross sectional area of the column. Although uniform flow can be achieved, complete mixing requires elaborate and expensive devices and often results in an increase in column heights. This is especially true of large diameter columns, such as those with a diameter greater than about 2 meters.

Applicants' apparatus and methods achieve the benefits of complete mixing in a cost efficient manner without taking more elaborate steps that would be needed to obtain complete compositional mixing. The optional filter helps protect the liquid distributor and packed column from debris that can accumulate from the distillation and/or feed sections above. Such debris can clog holes in the liquid distributor and lead to a performance shortfall in the packed column below. Thus, in addition to providing for high efficiency of the packed column that can result in shorter bed heights than possible with prior art distributors, Applicants' apparatus and methods provide for more reliable operation due to eliminating or minimizing problems that can be caused by debris.

For clarity, FIGS. 2A-2G, 3A-3E, 4A-4B, and 5 illustrate only parts of the overall apparatus of the described embodiments.

As shown in FIGS. 2A-2C, the apparatus 60 is installed in the inner space of column 62. (The inner space is the space contained within the inside wall of column 62.) The inner space of column 62 in FIGS. 2A-2C is divided into column sides "A" and "B".

Figures 2D, 2E:
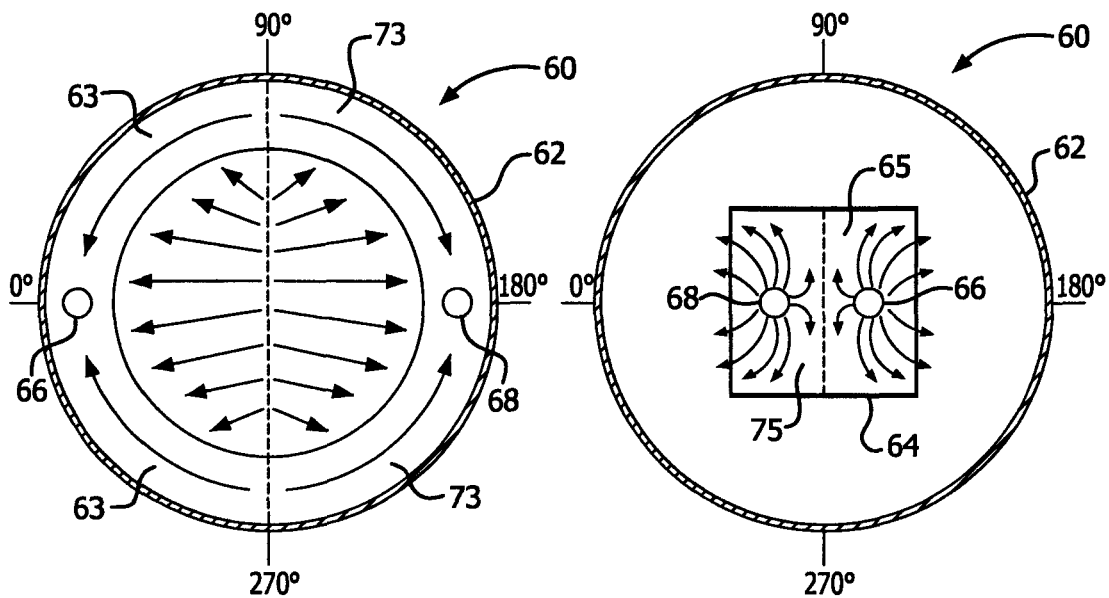
FIGS. 2D and 2F are schematic diagrams of a cross-sectional plan view illustrating sectors of a collector and geometric centers of sectors of one embodiment of Applicants' apparatus.
FIGS. 2E and 2G are schematic diagrams of a cross-sectional plan view illustrating zones of a mixer and geometric centers of zones of one embodiment of Applicants' apparatus.

FIGS. 2A-2G show some features of one embodiment of the apparatus that will be described to illustrate how this embodiment operates. Referring to FIG. 2A, liquid from a packed section (not shown) above drops down onto the collector 61. In the illustrated embodiment, the collector 61 has a ring element adjacent the inner wall of the column 62. The liquid flows from the collector 61 into the mixer 64 through conduits 66 and 68. The liquid flows from the two conduits are combined in mixer 64. Liquid exits mixer 64 and is ultimately distributed to the packing (not shown) below.

Preferably, all or substantially all of the liquid descending from above in column 62 passes through collector 61 and the conduits (66 and 68) and does not bypass the collector 61 or the conduits (66 and 68). Examples of equipment which may be used for collectors are shown in FIGS. 3-7 of U.S. Pat. App. Pub. No. 2009/0049864 A1 (Kovak, et al.), which is incorporated herein by reference in its entirety for all that it teaches without exclusion of any part thereof.

In the embodiment illustrated in FIGS. 2A-2C, conduit 66 conveys liquid collected from the column side "B" above to the column side "A" below, while conduit 68 conveys liquid from the column side "A" above to the column side "B" below. In other words, and as depicted by the arrow in FIG. 2C, liquid entering conduit 66 from collector 61 is transposed by 180 degrees in the circumferential direction by the time it exits conduit 66 into mixer 64 (i.e., the liquid is transposed circumferentially). Although it is desirable for column side "A" and column side "B" in the illustrated embodiment to be uniform, persons skilled in the art will recognize that variations are possible to account for mechanical considerations.

To clarify the workings of Applicants' apparatus and methods for systems with asymmetric conduit locations, or for systems with more than two conduits, it is helpful to understand where the flow into a conduit originates and where the flow out of the conduit goes. This may be explained using the schematic illustrations in FIGS. 2D-2G.

Referring first to FIG. 2D, the concept of a "sector" of collector 61 is introduced. As shown in FIG. 2D, liquid from the packing (not shown) above the collector 61 drops onto the collector 61, flows in the directions indicated by the arrows, and into the inlets of the conduits (66 and 68). Due to the symmetry of the conduit locations (i.e. the inlets of the conduits 66 and 68 are 180° apart) liquid flows into two sectors of the collector 61, a first sector 63 and a second sector 73. The liquid from the first sector 63 flows into the inlet of conduit 66; and liquid from the second sector 73 flows into the inlet of conduit 68.

Figures 2F, 2G:
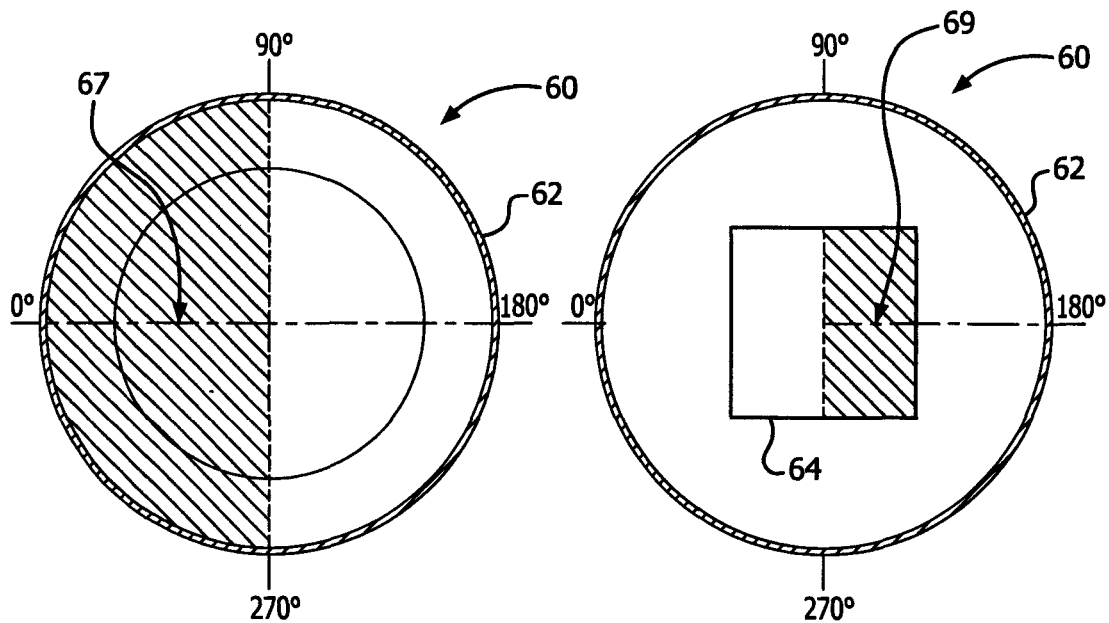

Referring now to FIG. 2F, the geometry of the first sector 63 of collector 61 is an area bounded by a semi circle and a chord running from 90° to 270° (i.e., the area denoted by cross hatching). The geometric center of the first sector 63 lies on the line running from the center of the circle (the center of column 62) and the 0° location on the inner wall of the column 62. The location of this geometric center is approximately as indicated by the arrow 67.

Referring next to FIG. 2E, the concept of a "zone" of mixer 64 is introduced. As shown in FIG. 2E, liquid from the conduits 66 and 68 discharges into the mixer 64, flows in the direction indicated by the arrows, exits into the final distributor (not shown), and ultimately is transmitted to the packing (not shown) below. Due to the symmetry of the conduit locations (i.e. the outlets of conduits 66 and 68 are 180° apart) liquid flows into two zones of the mixer 64, a first zone 65 and a second zone 75. The liquid flows from the outlet of conduit 66 into the first zone 65; and liquid flows from the outlet of conduit 68 into the second zone 75.

Referring now to FIG. 2G, the geometry of the first zone 65 of the mixer is a rectangular area denoted by cross hatching. The geometric center of the first zone 65 lies on the line running from the center of the circle (the center of column 62) and the 180° location on the inner wall of the column 62. The location of this geometric center is approximately as indicated by the arrow 69.

For the embodiment described in the preceding paragraphs and shown in FIGS. 2A-2G, liquid from the first sector 63 of the collector 61 is transmitted, via conduit 66, to the first zone 65 of the mixer 64, wherein the geometric center 67 of the first sector 63 of the collector 61 is positioned circumferentially away from the geometric center 69 of the first zone 65 of the mixer 64 by 180°.

Figure 3A:
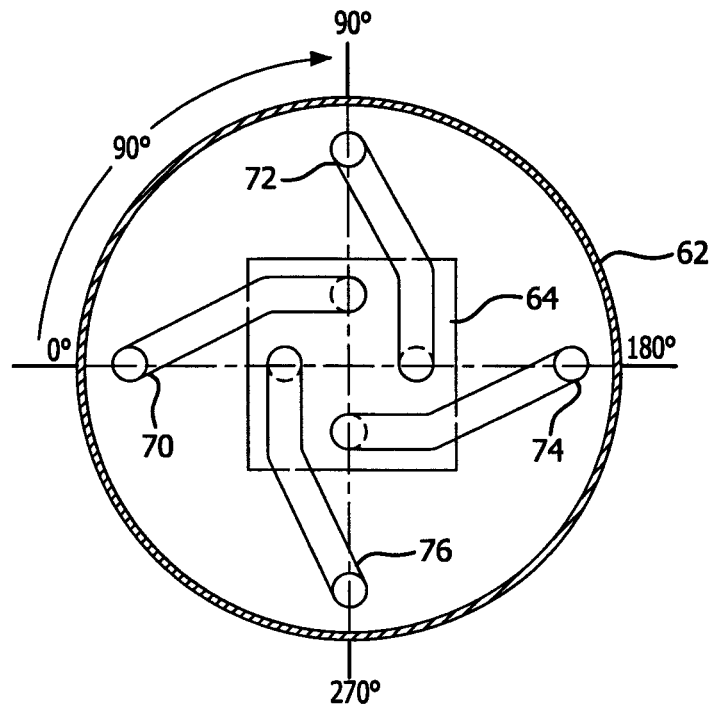
FIG. 3A is a schematic diagram of a cross-sectional plan view of another embodiment of Applicants' apparatus.

FIGS. 3A-3E show some features of another embodiment that will be described to illustrate how this embodiment operates with more conduits. Referring to FIG. 3A, there are four conduits 70, 72, 74, and 76, which collect liquid from collector 61 and deliver that liquid to mixer 64. Preferably, all or substantially all of the liquid descending from above in column 62 passes through collector 61 and the conduits (70, 72, 74, 76) and does not bypass the collector 61 or the conduits.

Figures 3B, 3C:
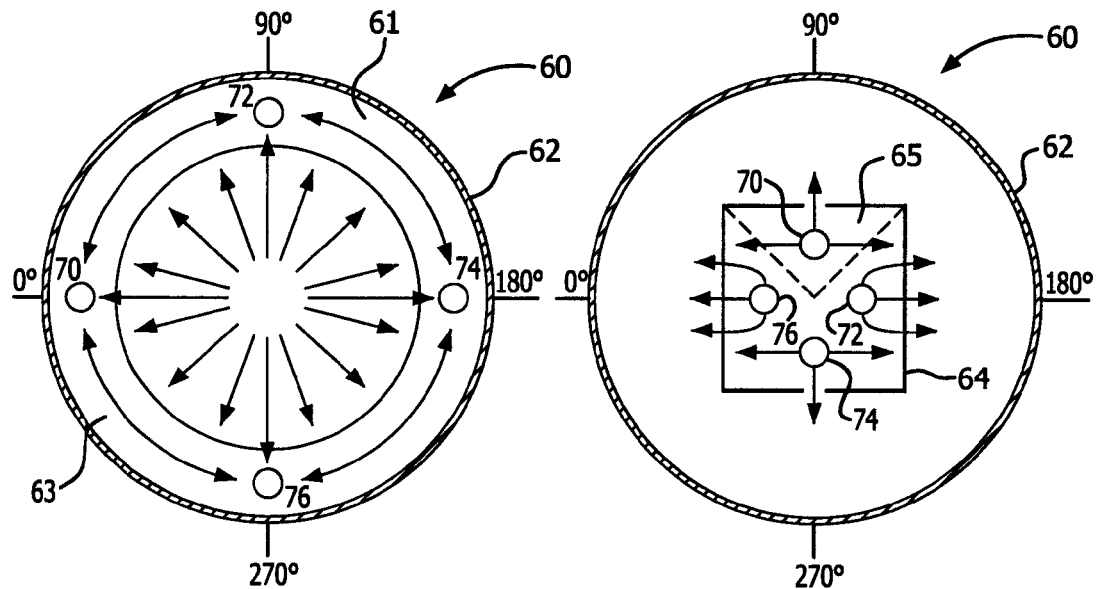
FIGS. 3B and 3D are schematic diagrams of a cross-sectional plan view illustrating sectors of a collector and geometric centers of sectors of another embodiment of Applicants' apparatus.
FIGS. 3C and 3E are schematic diagrams of a cross-sectional plan view illustrating zones of a mixer and geometric centers of zones of another embodiment of Applicants' apparatus.

Referring now to FIG. 3B, liquid from the packing (not shown) above drops onto the collector 61, flows in the directions indicated by the arrows, and into the inlets of the four conduits (70, 72, 74, 76). Due to the symmetry of the conduit locations (i.e. the inlets of conduits 70, 72, 74, and 76 are 90° apart) liquid flows into four sectors of the collector 61. The liquid from the first sector 63 flows into conduit 70.

Figures 3D, 3E:
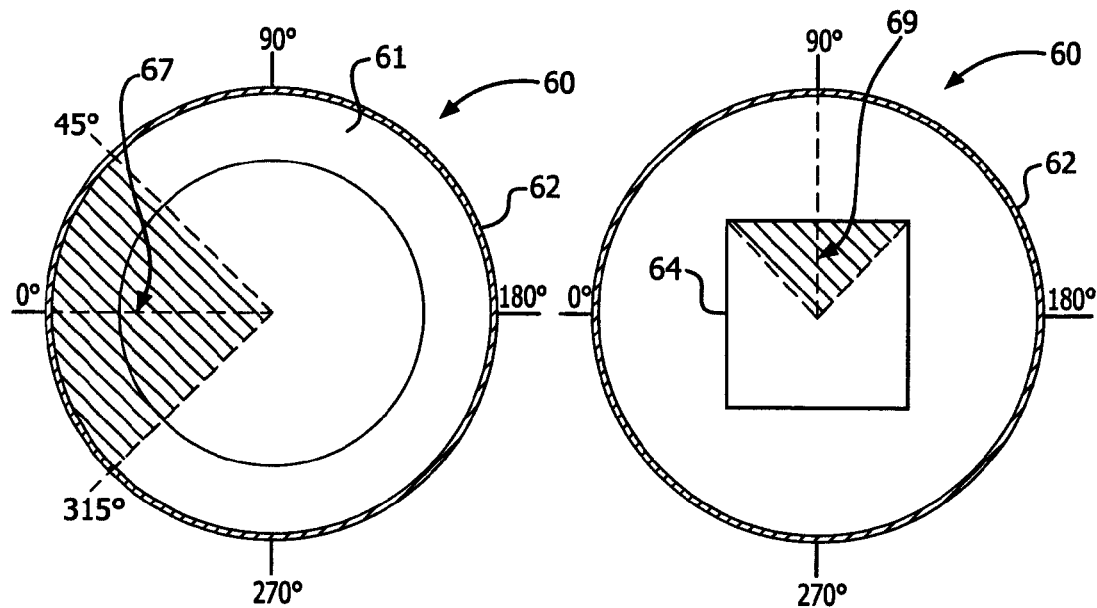

Referring now to FIG. 3D, the geometry of the first sector 63 of collector 61 is a pie-shaped area bounded by part of the circumference (the inner wall of column 62) and two lines: one line running from the 45° point on the circumference to the center (the center of column 62); the other line running from the 315° point on the circumference to the center. The pie-shaped area is denoted with cross hatching. The geometric center of this first sector 63 of the collector 61 lies on the line running from the center of the circle (the center of column 62) and the 0° location on the inner wall of the column 62. The location of the geometric center is approximately as indicated by the arrow 67.

Referring next to FIG. 3C, liquid from the conduits (70, 72, 74, 76) discharges into the mixer 64, flows in the directions indicated by the arrows, and exits into the final distributor (not shown), and ultimately to the packing (not shown) below. Due to the symmetry of the conduit locations (i.e. the outlets of conduits 70, 72, 74, and 76 are 90° apart) liquid flows into four zones of the mixer 64. The liquid flows from the outlet of conduit 70 into the first zone 65. Referring now to FIG. 3E, the geometry of the first zone 65 of the mixer 64 is a triangular area denoted by cross hatching. The geometric center of the first zone lies on the line running from the center of the circle (the center of column 62) and the 90° location on the inner wall of the column 62. The location of the geometric center is approximately as indicated by the arrow 69.

For the embodiment described in the preceding paragraphs and shown in FIGS. 3A-3E, liquid from the first sector 63 of the collector 61 is transmitted, via conduit 70, to the first zone 65 of the mixer 64, wherein the geometric center 67 of the first sector 63 of the collector 61 is positioned circumferentially away from the geometric center 69 of the first zone 65 of the mixer 64 by 90°.

As discussed above and illustrated in FIGS. 2A-2G and 3A-3E, as used herein, a "sector" of the collector 61 is a geometric portion of the upper surface area of the collector 61 from which liquid is received by a conduit, and a "zone" of the mixer 64 is a geometric portion of the volume of the mixer 64 to which liquid is transmitted by a conduit. Since the shapes and dimensions of the sectors of the collector 61 may vary, as may the shapes and dimensions of the mixer 64, the relative position that a sector is positioned circumferentially away from a zone (e.g., 60 degrees, 180 degrees, or some other degrees) may be measured from the geometric center of said sector to the geometric center of said zone.

Note that the embodiments illustrated in FIGS. 2A-2G, and 3A-3E are only representative embodiments. Other embodiments may transpose the liquid from multiple conduits in a regular manner, or some other manner, and in different circumferential directions. For example, the liquid may be transposed circumferentially in a conduit by between about 60 and 180 degrees, preferably by between about 120 and 180 degrees, and most preferably by about 180 degrees.

Although the embodiments illustrated in FIGS. 2A-2G, and 3A-3E suggest uniformity in the conduits, the sectors of the collector 61, and the zones of the mixer 64 from which and to which the liquid is transmitted by the conduits, persons skilled in the art will recognize that variations are possible in the collector 61 and the mixer 64, and in the shapes, dimensions, and locations of the conduits to account for mechanical considerations.

The arrows in FIG. 2E are idealized and represent a case with little or no mixing of liquids. Persons skilled in the art will recognize that various means may be employed in the mixer to encourage better, or more complete, mixing, but those means (i) add mechanical complexity; (ii) add cost; and (iii) in general are only partially effective since a compromise is usually made to achieve mixing that is "good enough." Applicants' apparatus and methods overcome those problems by providing good performance even for the case shown in the Figures with little or no mixing.

The cross sectional area of the mixer 64 is a relatively small percentage of the total cross sectional area of the inner space of the column 62. To enhance overall mixing, transposing circumferentially the liquid from the collector 61 to the mixer 64 is provided to compensate for any lack of complete mixing which may occur in the mixer 64. This may be important in packed sections performing sensitive separations and in very large distillation columns. If liquid from outside of column 62 needs to be brought in, such liquid may be placed within the mixer 64 in the space between or besides the conduits, such that all or substantially all of the liquid feeding the packed section below will be well mixed, or at least split substantially uniformly to column sides "A" and "B" (illustrated in FIGS. 2A and 2B).

In the described embodiments, the mixer 64 occupies no more than 25%, and preferably no more than 20%, of the cross sectional area of the inner space of the column 62.

FIGS. 2A-2C show an arrangement with two conduits 66, 68, and FIG. 3 shows an arrangement with four conduits 70, 72, 74, 76. However, other numbers of conduits may be used, and the conduits may have different shapes. Also, the conduits in alternative arrangements need not be identical to each other. The conduits (e.g., 66 and 68, or 70, 72, 74, and 76) shown in FIGS. 2C, and 3A are illustrated as circularly shaped conduits positioned at the locations shown relative to the column 62 and the mixer 64. However, the conduits could have other shapes and/or be positioned at other locations.

Persons skilled in the art will recognize that many variations are possible with respect to the size, shape, location, length, arrangement, and number of the conduits. Conduits of many kinds, located and arranged in many ways, may serve the purposes of the conduits shown in the embodiments discussed and illustrated herein.

Figure 4A:
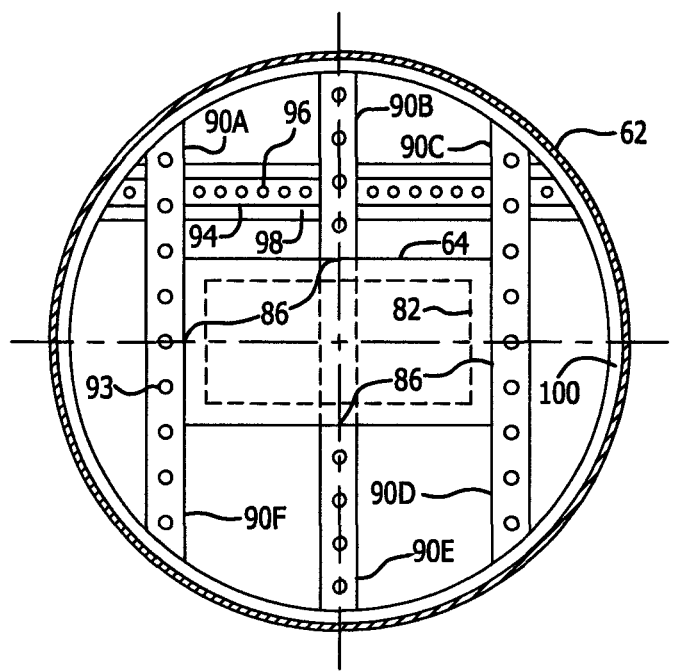
FIG. 4A is a schematic diagram of a cross-sectional plan view of a portion of Applicants' apparatus between two packed sections in a packed column.
Figure 4B:
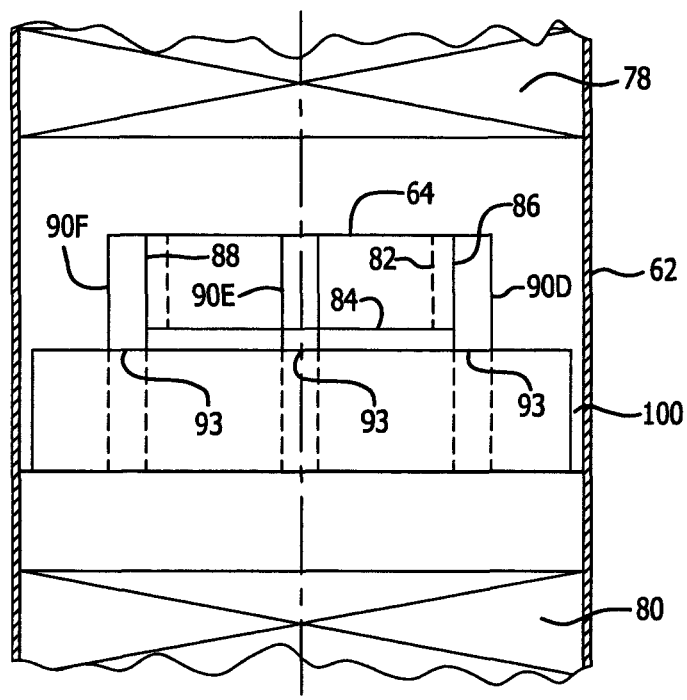
FIG. 4B is a schematic diagram of a cross-sectional elevational view of a portion of Applicants' apparatus between two packed sections in a packed column.

Other parts of the apparatus are now described with reference to FIGS. 4A, 4B, and 5. FIGS. 4A and 4B show an embodiment of part of the apparatus to be placed in a column 62 and between two packed sections 78 and 80. The packed sections may include structured packing, random packing, or other suitable liquid-vapor contacting means.

The apparatus includes a mixer 64 which is rectangular in cross section in the embodiment illustrated in FIGS. 4A and 4B. Persons skilled in the art will recognize that the mixer 64 may take many shapes or forms, and may be located in other positions, although a central mixer 64 is illustrated. Optionally, a filter 82 is placed inside the mixer 64. For clarity, the collector and conduits that feed the liquid to the mixer from section 78 above are not shown, but they would feed all or substantially all of the liquid inside the filter 82 within the mixer 64 and in a circumferentially transposed arrangement as described earlier.

The mixer 64 has a solid floor 84 in the embodiment illustrated in FIGS. 4A and 4B. Thus, all the liquid collected in the mixer 64 flows through filter 82 when the filter 82 is in use and then through perforated vertical walls 86 to a predistributor 88 that includes channels 90A-90F. The other parts of the perforated vertical walls 86 of the mixer 64 that are not connected to the channels 90A-90F are solid to contain the liquid and to hold a level within the mixer 64.

Each of the channels 90A-90F has an upper chamber and a lower chamber. The chambers are separated by a perforated plate with perforations 93. Thus, liquid from the upper chamber of each channel 90A-90F descends through perforations 93 of the perforated plate into the respective lower chamber. The lower chambers of the channels 90A-90F are connected with a plurality of troughs such as trough 94 shown as an example.

Each trough 94 has an array of perforations 96 to feed liquid to the packed section 80 below. In the illustrated embodiment, the troughs are arranged in a parallel fashion alternating with spaces 98 for the vapor to rise up the column 62. The troughs are also connected to an annular gutter 100. There is an interconnected network of the troughs, the annular gutter 100, and portions of the lower chambers of the channels 90A-90F which allow for hydraulic gradients to even out in order to create very uniform flow of liquid through the perforations 96 to the packed section 80 below.

Figure 5:
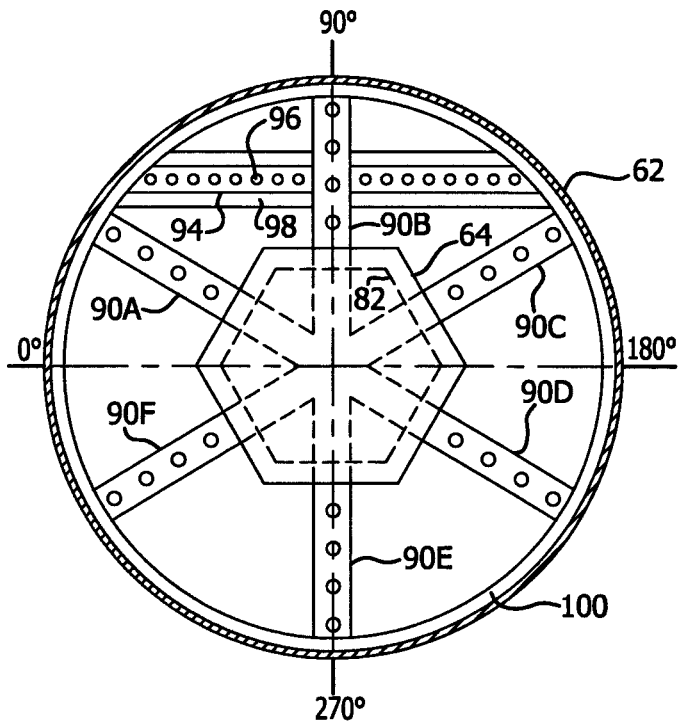
FIG. 5 is a schematic diagram of a cross-sectional plan view of another embodiment of a portion of Applicants' apparatus between two packed sections in a packed column.

FIG. 5 shows another embodiment that also has six channels 90A-90F, which are arranged in a hexagonal pattern. Only the plan view is shown in FIG. 5. In terms of the other features, the embodiment in FIG. 5 is similar to the embodiment in FIGS. 4A and 4B. These are only illustrative examples in which the predistributor has six channels 90A-90F. Persons skilled in the art will recognize that different arrangements may be used with fewer channels (e.g., 2 or 4 channels) or more channels (e.g., 8 or 10 channels). Also, the mechanical means for supporting the mixer, the predistributor, the final distributor, and the packed sections within the column are not shown for clarity.

In the embodiments illustrated in FIGS. 4A, 4B, and 5, an annular-shaped gutter 100 may receive some of the liquid. The annular-shaped gutter 100 preferably is continuous and adjacent the perimeter of the inner wall of the column 62, as shown in FIGS. 4A and 5.

Although the above descriptions of several embodiments of the apparatus are in terms of a packed column with a circular cross sectional area, other embodiments of the apparatus can be used in non-circular columns, including, for example, divided wall columns. The features of a mixer with a limited cross sectional area, circumferentially transposed conduits, a filter, a predistributor, and a final distributor need to be designed and arranged in a suitable manner taking into account the non-circular nature of the packed column sections within one or both sides of a divided column or other column of non-circular shape.

Applicants' process for separating gases, e.g., nitrogen, oxygen, and/or argon, from air by cryogenic distillation, which utilizes at least one liquid-vapor contacting column with at least two liquid-vapor contacting sections, may include an apparatus for collecting, mixing, and distributing a descending liquid from the upper liquid-vapor contacting section to the lower liquid-vapor contacting section like Applicants' apparatus discussed above. Optionally, when a liquid feed is introduced between the upper and lower liquid-vapor contacting sections of the column from outside the column, all or some of the external feed may be placed into the mixer as discussed above.

One embodiment of Applicants' method for assembling an apparatus for distributing liquid in a liquid-vapor contacting column with at least two liquid-vapor contacting sections includes the steps of providing and assembling the components of an apparatus like Applicants' apparatus discussed above. Assembling the components into a liquid-vapor contacting column may be done with suitable support means that may include rivets and welds.

Applicants' apparatus and methods include many other embodiments and variations thereof which are not illustrated in the drawings or discussed in the Detailed Description section. Those embodiments and variations, however, do fall within the scope of the appended claims and equivalents thereof.

Persons skilled in the art will recognize that the embodiments and variations illustrated in the drawings and discussed in the Detailed Description section do not disclose all of the possible arrangements of Applicants' apparatus, and that other arrangements are possible. Accordingly, all such other arrangements are contemplated by Applicants' apparatus and methods, and are within the scope of the appended claims and equivalents thereof.

Persons skilled in the art also will recognize that many other embodiments incorporating Applicants' inventive concepts are possible, as well as many variations of the embodiments illustrated and described herein.

Although Applicants' apparatus and methods are discussed herein in connection with structured packing, persons skilled in the art will recognize that Applicants' apparatus and methods also may be used with other types of packing (e.g., random packing).

EXAMPLES

The efficiency of distillation that occurs in the various packed sections of the double column cycle is sensitive to maldistribution in both the composition and flow of the vapor and liquid phases within those sections. Referring to FIG. 1, this is particularly true of sections 13, 15, 23, and 25. In the Examples below, the sensitivity to maldistribution is analyzed by a well known method in the chemical engineering literature, which is referred to as parallel column analysis.

Example 1

Figure 6:
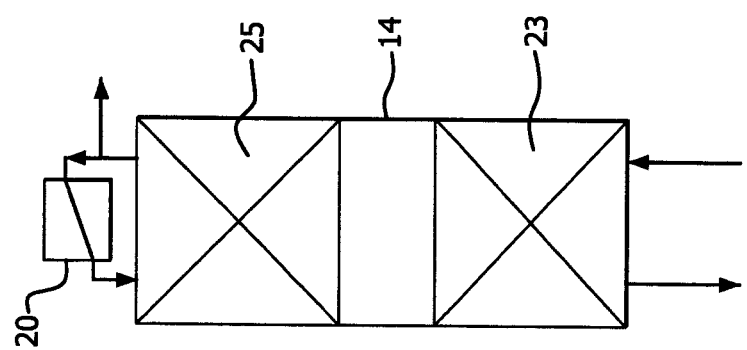
FIG. 6 is a schematic diagram used in the parallel column analysis of Example 1.

First consider the argon column 14 with its sections 23 and 25, such as described earlier under the double column cycle illustrated in FIG. 1. A schematic diagram with the normal flow and operating conditions within those two sections is shown in FIG. 6. Each of the two sections contains 35 theoretical stages and operates at a pressure of about 1.3 bara. The column operates at a molar liquid to vapor ratio of about 0.97 at the top of the column. Vapor feed at the bottom has a composition of 12% argon, 0.0010% nitrogen, and the balance oxygen. Under normal operation the composition of the crude argon product (CGAR) at the top would be 99.67% argon, 0.02% nitrogen, and the balance oxygen.

Figure 7:
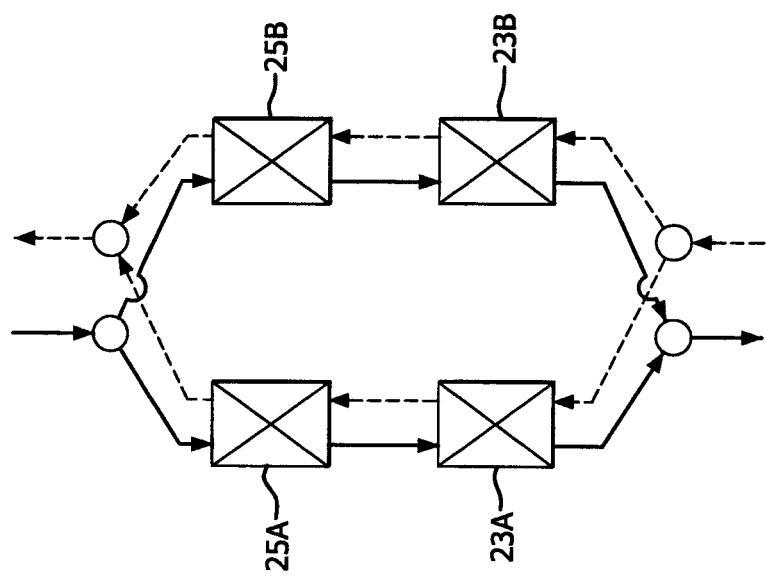
FIG. 7 is another schematic diagram used in the parallel column analysis of Example 1 for the Base Case Liquid Maldistribution.

In performing parallel column analysis, each section is further considered to be split into two equal halves, namely 23A, 23B and 25A, 25B, as shown in the schematic illustration of FIG. 7. The respective sections A and B are equal in cross section and isolated from each other. Nominally they would carry half of the total column liquid and vapor inside each of them. To evaluate sensitivity to maldistribution, the flow of liquid (solid lines in FIG. 7) is assumed to be higher on the A side and lower on the B side, while the flow of vapor (dashed lines in FIG. 7) is distributed uniformly to the two halves. There is no mixing or transfer of liquid or vapor between the two halves of the sections A and B. The level of maldistribution, defined by the parameter Flow lambda, is defined as the difference between the high and average liquid flows divided by the average of the two flows and mathematically as follows:

Flow lambda=(high liquid flow−low liquid flow)/
(high liquid flow+low liquid flow)

The effect of Flow lambda is determined as follows: 1) first, for a given degree of maldistribution, the CGAR composition is computed using the schematic of FIG. 7; 2) next, the stages are reduced for the schematic of FIG. 6 until the CGAR composition is the same as that obtained from the schematic of FIG. 7; and 3) then, the fractional stages is computed as the stages used for the schematic of FIG. 6 in step 2 divided by the stages used for the schematic of FIG. 7. The fractional stages thus obtained is plotted versus Flow lambda in the bottom-most curve in FIG. 8 (denoted "Base case liquid maldistribution"). As seen, the performance degrades significantly with flow maldistribution.

Figure 8:
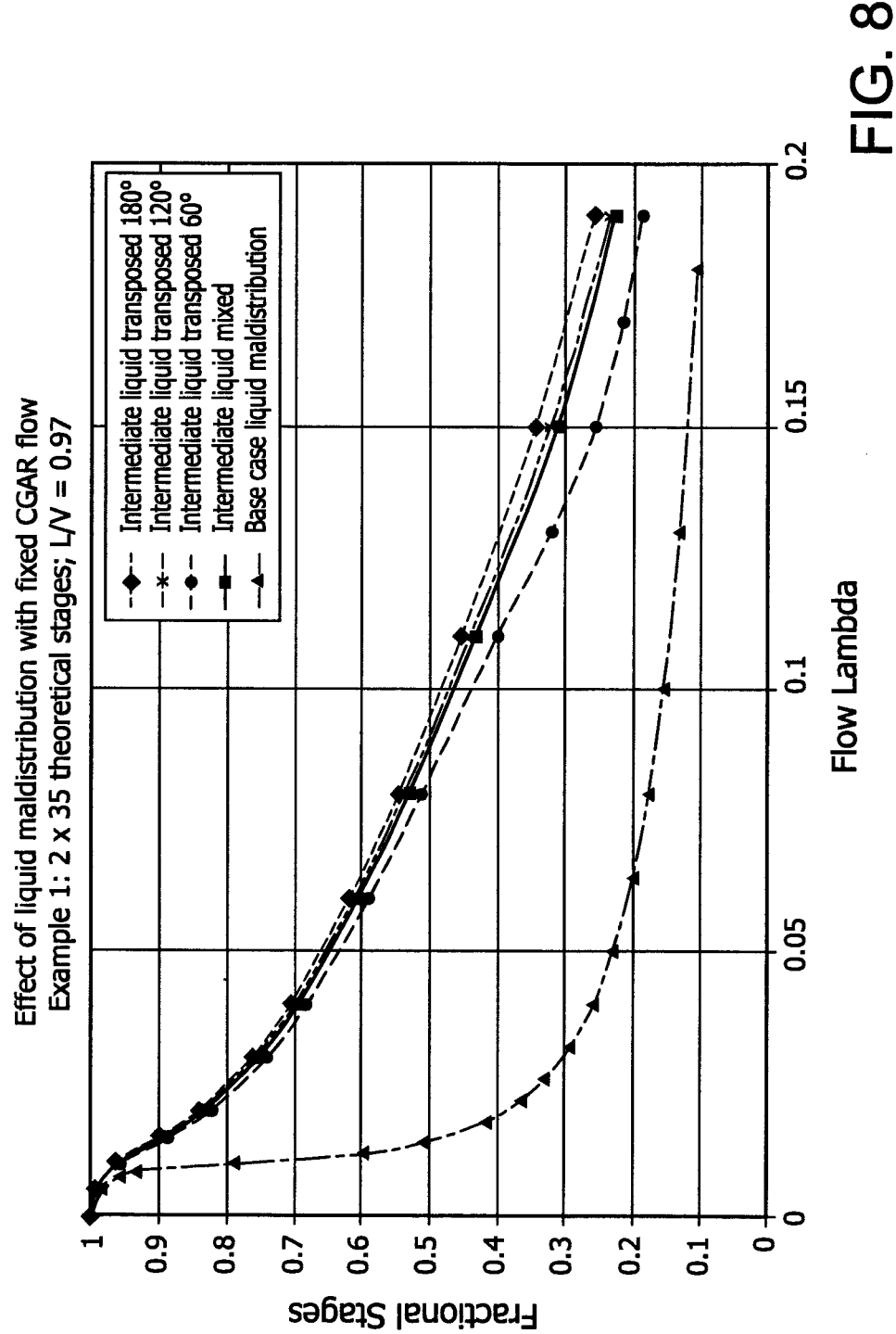
FIG. 8 is graph illustrating the effect of liquid maldistribution with fixed CGAR flow showing the results for Example 1.
Figure 9:
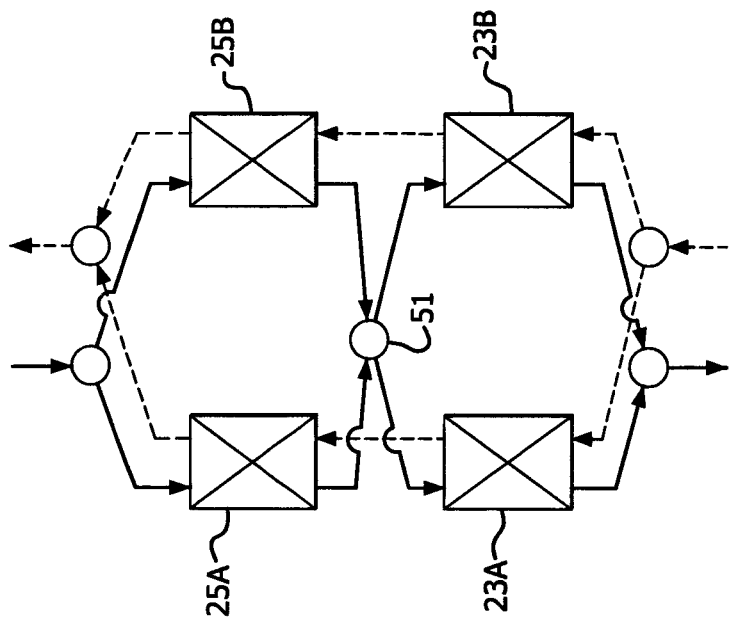
FIG. 9 is another schematic diagram used in the parallel column analysis of Example 1 for the Case of Intermediate Liquid Mixed.

A second case is then simulated under the conditions shown in the schematic illustration of FIG. 9. In this case the liquids coming out of the bottom of sections 25A and 25B are mixed in device 51 and redistributed from there in the same high and low flow proportions to the sections 23A and 23B below. The effect of intermediate mixing of the liquid is shown in FIG. 8 as the "intermediate liquid mixed" curve. As seen, the performance—while still worse than the ideal value of 1.0 for fractional stages—is now significantly improved compared to the base case liquid maldistribution with no intermediate mixing. This effect is well understood in the literature.

Figure 10:
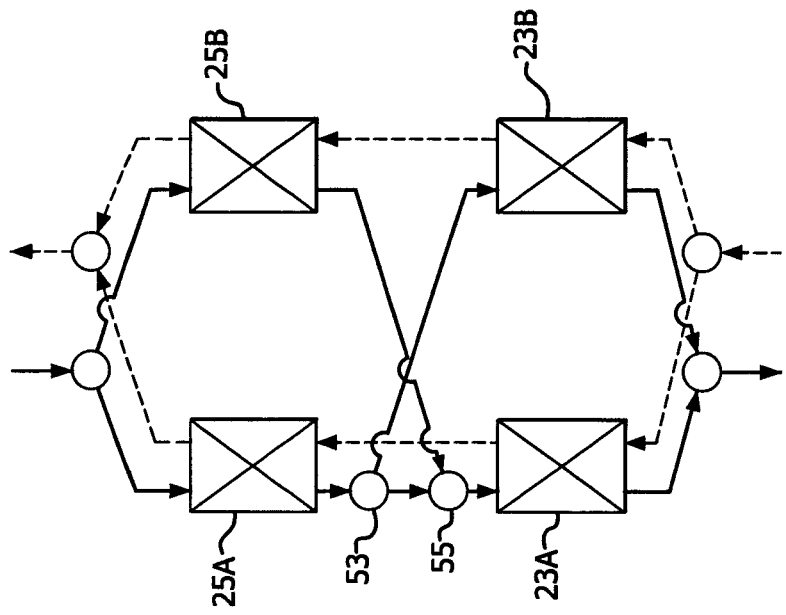
FIG. 10 is another schematic diagram used in the parallel column analysis of Example 1 for the Case of Intermediate Liquid Transposed 180°.

A third case is then simulated under the conditions shown in the schematic illustration of FIG. 10. In this case, all the liquid from upper section 25B is transposed to 23A via mixer 55, but only a portion of the liquid corresponding to low flow is transposed from upper section 25A to lower section 23B via splitter 53. The other portion from 25A is transmitted to 23A via splitter 53 and mixer 55. This is the most that can be transposed while also imposing flow imbalances. It is seen that the resulting performance as shown by the upper-most curve in FIG. 8 as "intermediate liquid transposed 180°" is even better than for the case where the liquid is completely mixed. This is a surprising finding that was not previously taught. The surprising and unexpected results were surprising and unexpected to Applicants and would be surprising and unexpected to persons of ordinary skill in the art.

The practical significance of this calculation may be explained as follows. A collector, mixer and liquid distributor may be used in between sections 23 and 25. But if the liquid from the upper sections are transported without transposing into the lower sections and incomplete mixing occurs within the mixer, then the performance will be somewhere in between the base case and the intermediate liquid mixed case in FIG. 8. On the other hand, if the liquid is transposed to the diametrically opposite sides into the mixer, and if there is incomplete mixing, then the performance will be somewhere in between the intermediate liquid transposed 180° case and the intermediate liquid mixed case. Thus, the result with transposing by 180° will be better than the result without transposing by 180°.

In these calculations it is assumed that there is no vapor mixing between the two lateral halves of the packed sections. In practice there will be some mixing, which becomes less effective as the column cross sections become large. It is seen that transposing the liquid by 180° compensates for inadequate liquid mixing in the distributor as well as inadequate vapor mixing in the packed column sections. This is a surprising and unexpected result, which was surprising and unexpected to Applicants and would be surprising and unexpected to persons of ordinary skill in the art.

If there is perfect liquid mixing in the liquid distributor, then there will be no gain from transposing the liquid by 180°. But the means to achieve perfect mixing, such as static mixers, are expensive in terms of pressure drop, column height and cost of the overall system. Applicants' apparatus and methods of utilizing transposing of liquid by 180° will outperform the case with no transposing, and in the worst case will at least match the perfectly mixed case and at very little added cost.

While the above cases clearly demonstrate the advantages of transposing the intermediate liquid by 180° to the opposite side of the column, there are situations in which the mechanical configurations can limit the angle by which transposing can be accomplished. But as will be demonstrated below most of the benefit can be achieved even by transposing by an angle that is much smaller than 180°. So a fourth case is simulated under the conditions shown in the schematic illustration of FIG. 11. In this case only two thirds (⅔) of the liquid from upper section 25B is transposed to 23A via splitter 57 and mixer 55 and the equivalent amount of liquid from the upper section 25A is transposed to 23B via splitter 53 and mixer 59. The remaining liquid from the upper sections 25A and 25B are fed to the lower sections 23A and 23B without transposing via the splitters and mixers shown directly between them. This is equivalent to transposing the liquid from the two halves of a column by 120° each. It is seen that the resulting performance as shown by the second to the upper-most curve in FIG. 8 as "intermediate liquid transposed 120°" is also better than the case where the liquid is completely mixed though it is not as good as the case for transposing by 180°. But this is also a surprising result as the effect of even a partial transposing of the intermediate liquid exceeds that of complete mixing.

Figure 11:
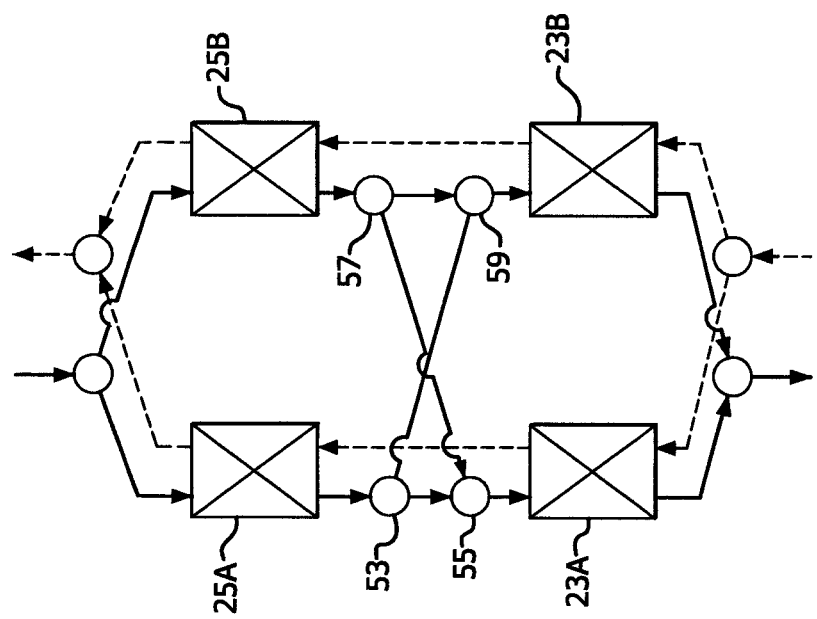
FIG. 11 is another schematic diagram used in the parallel column analysis of Example 1 for the Cases of Intermediate Liquid Transposed 120° and Intermediate Liquid Transposed 60°.

Further, a fifth case is simulated under the conditions shown in the schematic illustration of FIG. 11. In this case only one third (⅓) of the liquid from upper section 25B is transposed to 23A via splitter 57 and mixer 55 and the equivalent amount of liquid from the upper section 25A is transposed to 23B via splitter 53 and mixer 59. The remaining liquid from the upper sections 25A and 25B are fed to the lower sections 23A and 23B without transposing via the splitters and mixers shown directly between them. This is equivalent to transposing the liquid from the two halves of a column by 60° each. It is seen that the resulting performance as shown by the second from the lower-most curves in FIG. 8 as "intermediate liquid transposed 60°" is a significant improvement over the base case and approaches the benefit of the intermediate liquid mixed case.

Figure 12:
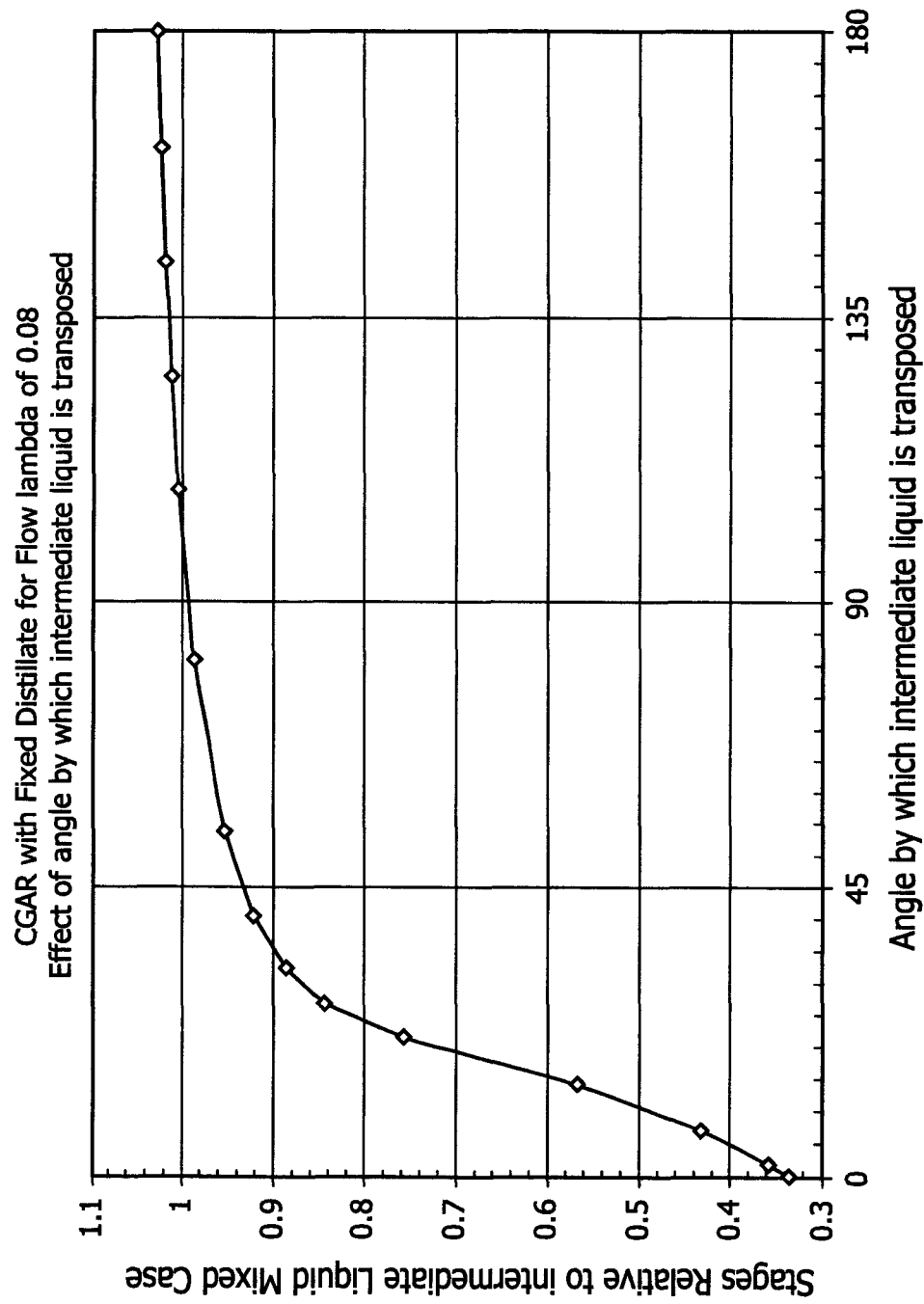
FIG. 12 is a graph illustrating the effect of the angle by which intermediate liquid is transposed in Example 1.

As a further illustration, FIG. 12 shows the effect of the angle by which intermediate liquid is transposed on the stages obtained relative to complete mixing. This is an illustrative curve for the calculations as outlined above in Example 1 for the specific case wherein Flow lambda has a value of 0.08. A value of 1.0 on the ordinate corresponds to the stages obtained for the intermediate liquid mixed case. As seen, the performance increases rapidly as the angle by which liquid is transposed increases, reaching a value higher than 95% at about 60°. Beyond this the gain is more gradual and the overall performance is over 100% when the angle is in the range of 120° to 180°.

Example 2

Figure 13:
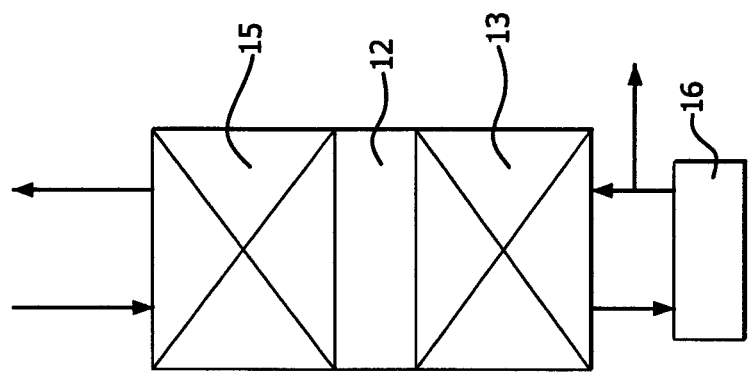
FIG. 13 is a schematic diagram used in the parallel column analysis for Example 2.

Next consider the bottom of the low pressure column 12 with its sections 13 and 15 such as described earlier under the double column cycle illustrated in FIG. 1. A schematic diagram with the normal flow and operating conditions within those two sections is shown in FIG. 13. Each of the two sections contains 20 theoretical stages and operates at a pressure of about 1.3 bara. The column operates at a molar liquid to vapor ratio of about 1.40 at the top of the column. Liquid feed at the top has a composition of 12% argon, 0.0010% nitrogen, and the balance oxygen. Under normal operation the composition of the GOX product at the bottom would be 99.80% oxygen and the balance argon.

Figure 14:
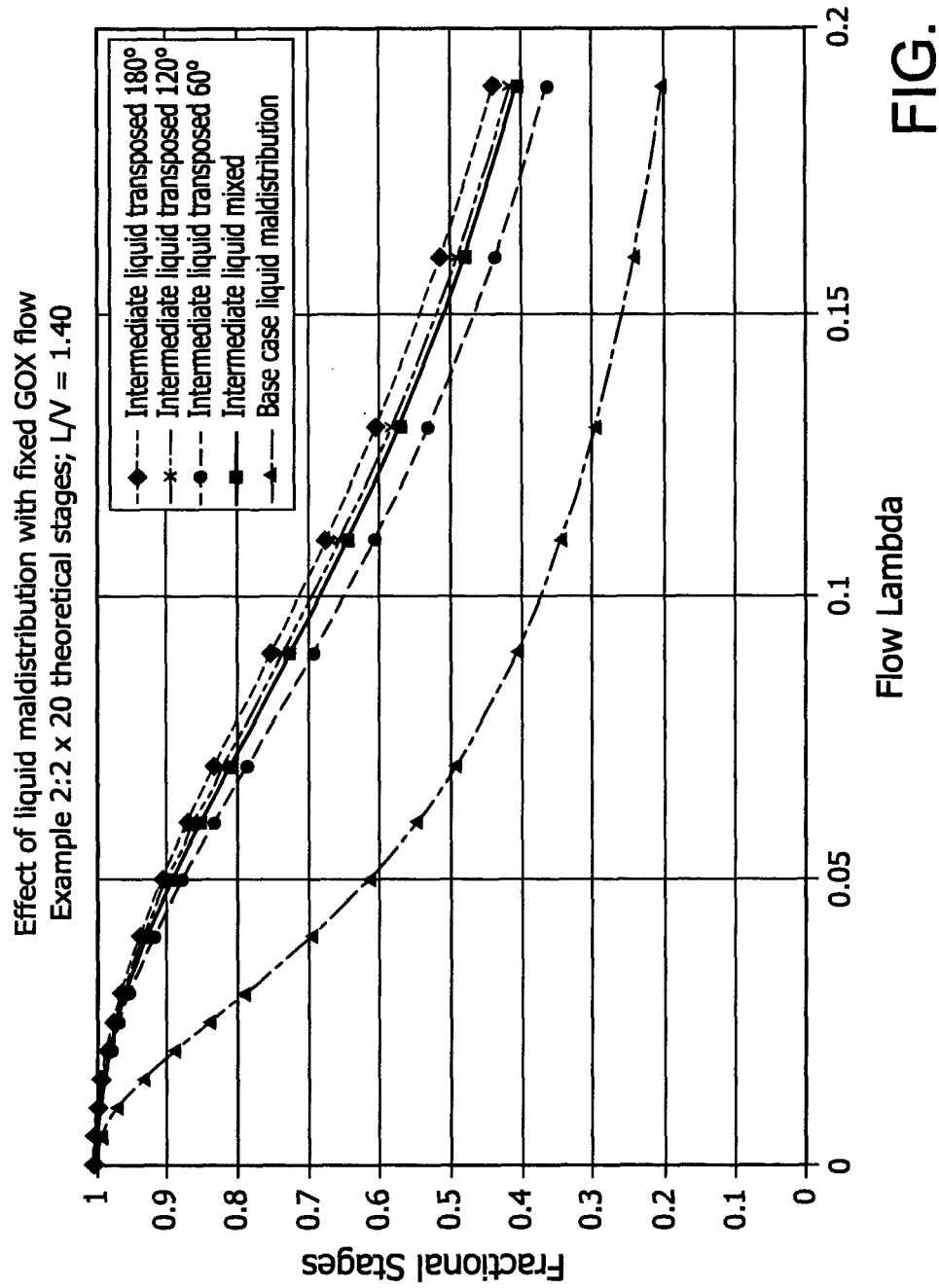
FIG. 14 is a graph illustrating the effect of liquid maldistribution with fixed GOX flow showing the results for Example 2.

Sensitivity to maldistribution is simulated in a manner similar to that used in Example 1. The corresponding five curves are shown in FIG. 14. Note that the curves show the same relationships wherein the intermediate liquid mixed case is a significant improvement over the base case, while the intermediate liquid transposed 180° case is even better. Likewise, the intermediate liquid transposed 120° case is also better than the intermediate liquid mixed case though not as good as the intermediate liquid transposed 180° case. Lastly, the intermediate liquid transposed 60° case is a significant improvement over the base case and approaches the performance of the intermediate liquid mixed case. The gain in performance in the last case would be more than 95% of the gain from perfect mixing for the case when Flow lambda equals 0.08 though this result is not shown as an explicit curve. Again, this efficacy of transposing intermediate liquid is a surprising and unexpected result in a manner similar to Example 1, which result was surprising and unexpected to Applicants and would be surprising and unexpected to persons of ordinary skill in the art.

As noted before in the process for separation of the components of air by cryogenic distillation, the two sections depicted in these examples are highly sensitive to maldistribution. In one case, the liquid to vapor ratio is less than one, and in the other case the ratio is more than one. In both cases, transposing of the liquid in between the packed sections by 120 to 180° is seen to be more effective than perfect mixing and redistribution of liquid in between the sections. And transposing of the liquid in between the packed sections by 60° achieves more than 95% of the benefit for the case when Flow lambda equals 0.08. This unexpected behavior has not been reported in any literature that the Applicants are aware of.

These results may be explained based on what are known as McCabe-Thiele diagrams, which are used to model the separation by distillation of binary mixtures. In the Examples, even though some nitrogen is present, its proportion is so small that the mixtures can be considered to be essentially binaries of argon and oxygen. A McCabe-Thiele diagram is constructed using two lines. One is an equilibrium line that shows the relationship between the compositions of the vapor and liquid phases that leave an equilibrium stage within a distillation column. A packed column does not have discrete equilibrium stages like a trayed column, but the equilibrium line is constructed the same way. The other line in the McCabe-Thiele diagram is an operating line that shows the relationship between the compositions of the vapor and liquid phases that cross each other at any given horizontal location or between equilibrium stages. The slope of the operating line is given by the ratio of the molar liquid and vapor flows within the column. In an efficient distillation column the equilibrium and operating lines will be spaced apart more or less uniformly away from each other, which will allow for the existence of sufficient driving forces to produce useful mass transfer within the entire column. In the case noted as base case liquid maldistribution in Example 1, the operating lines have different slopes from the nominal value of 0.97. Due to this condition, the operating lines in the columns with the high liquid flow pinch against the equilibrium line near the top with the result that very little separation occurs in the upper half and any useful separation occurs mostly in the lower half. Likewise, the operating lines in the columns with the low liquid flow pinch against the equilibrium line near the bottom with the result that very little separation occurs in the lower half and any useful separation occurs mostly in the upper half. Due to this mismatch, the compositions in the middle between the upper and lower sections in the two parallel columns turn out to be very different from each other, which condition is not ideal for efficient operation. This is the reason for the poor performance under the base case liquid maldistribution condition.

When the intermediate liquid is mixed and redistributed, the compositions between the two halves are brought closer together and the pinching effect, while still present, is less severe and thus the performance improves. However, when the intermediate liquid is transposed by 180° as in Example 1, the operating lines are modified such that the bottom section with the low liquid flow does more useful separation resulting in an overall composition with higher argon content in between the upper and lower sections. This effect in turn results in a higher overall argon content at the top of the column leading to more overall separation compared to the intermediate liquid mixed case. The mechanism by which performance improves when the intermediate liquid is transposed by the angles of 120° and 60° is similar to that of 180° though the benefits are proportionately lower.

Likewise, the results shown in Example 2 may be explained in an analogous way. In this case, the feed is at the top and intermediate transposing of liquid by 180° results in an overall composition that is higher in oxygen compared to the intermediate liquid mixed case. This effect in turn results in a higher overall oxygen content at the bottom of the column yielding more overall separation compared to the intermediate liquid mixed case. The mechanism by which performance improves when the intermediate liquid is transposed by the angles of 120° and 60° is similar to that of 180° though the benefits are proportionately lower.

Although the above description is a valid explanation of the effects seen in the Examples provided, Applicants' apparatus and methods do not depend on this explanation for their validity. It may be possible to offer alternative explanations as to why this behavior is observed. Also, as similar trends have been observed in two different packed sections with different operating conditions, Applicants believe that this is a general phenomenon that will be beneficial in most, if not all, types of distillation columns separating different types of mixtures. Thus, Applicants' apparatus and methods have very broad applicability.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An apparatus for distributing a flow of a liquid descending in an inner space of a packed column into a packed section, comprising:
   a collector having a plurality of sectors disposed in the inner space of the packed column and adapted to collect at least a portion of the flow of the liquid descending in the inner space of the packed column;
   a single mixer below and vertically spaced apart from the collector in the inner space of the packed column, and above and vertically spaced apart from the packed section in the inner space of the packed column, the single mixer having a plurality of zones disposed in the inner space of the packed column and adapted to receive and mix at least a portion of the liquid collected on the collector;
   a first conduit having a first end in fluid communication with a first sector of the collector and a second end in fluid communication with a first zone of the single mixer, the first conduit adapted to receive and transmit downward at least a portion of the liquid from the first sector of the collector to the first zone of the single mixer; and
   a second conduit having a first end in fluid communication with a second sector of the collector and a second end in fluid communication with a second zone of the single mixer, the second conduit adapted to receive and transmit downward at least a portion of the liquid from the second sector of the collector to the second zone of the single mixer,
   wherein a geometric center of the first sector of the collector is positioned circumferentially away from a geometric center of the first zone of the single mixer at a first angle relative to a central axis of the inner space of the packed column, and a geometric center of the second sector of the collector is positioned circumferentially away from a geometric center of the second zone of the single mixer at a second angle relative to a central axis of the inner space of the packed column, and
   wherein the single mixer has a planar cross-sectional area in a plane perpendicular to the central axis of the inner space of the packed column that is less than a planar cross-sectional area of the inner space of the packed column in the plane perpendicular to the central axis of the inner space of the packed column.

2. An apparatus as in claim 1, wherein the geometric center of the first sector of the collector is positioned circumferentially away from the geometric center of the first zone of the single mixer at the first angle by about 60° to about 180° relative to the central axis of the inner space of the packed column.

3. An apparatus as in claim 2, wherein the geometric center of the second sector of the collector is positioned circumferentially away from the geometric center of the second zone of the single mixer at the second angle by about 60° to about 180° relative to the central axis of the inner space of the packed column.

4. An apparatus as in claim 1, further comprising:
   a predistributor disposed in the inner space of the packed column and adapted to receive at least a portion of a flow of a mixed liquid from the single mixer and to transmit at least a part of the received flow of the mixed liquid outwardly from the predistributor.

5. An apparatus as in claim 4, further comprising:
   a final distributor disposed in the inner space of the packed column and adapted to receive at least a portion of a flow of a predistributed liquid from the predistributor and to transmit at least a portion of the received flow of the predistributed liquid substantially uniformly over at least a portion of a cross-sectional area of the inner space of the packed column.

6. An apparatus as in claim 5,
wherein the predistributor includes a plurality of channels adapted to transmit downward at least part of the received flow of the mixed liquid, and
wherein the final distributor includes a plurality of troughs adapted to transmit at least part of the flow of the predistributed liquid, each trough having at least one aperture and being in fluid communication with at least one channel of the predistributor.

7. An apparatus as in claim 1, further comprising a filter.

8. An apparatus as in claim 7, wherein the filter is disposed in the single mixer.

9. An apparatus as in claim 1, wherein the planar cross-sectional area of the single mixer in the plane perpendicular to the central axis of the inner space of the packed column occupies no more than about 25% of the planar cross-sectional area of the inner space of the packed column in the plane perpendicular to the central axis of the inner space of the packed column.

10. A method for assembling an apparatus for distributing a flow of a liquid descending in an inner space of a packed column into a packed section, comprising the steps of:
providing the packed column having the inner space;
providing in the inner space of the packed column a collector having a plurality of sectors and adapted to collect at least a portion of the flow of the liquid descending in the inner space of the packed column;
providing in the inner space of the packed column a single mixer below and vertically spaced apart from the collector, and above and vertically spaced apart from the packed section in the inner space of the packed column, the single mixer having a plurality of zones disposed in the inner space of the packed column and adapted to receive and mix at least a portion of the liquid collected on the collector;
providing a first conduit having a first end in fluid communication with a first sector of the collector and a second end in fluid communication with a first zone of the single mixer, the first conduit adapted to receive and transmit downward at least a portion of the liquid from the first sector of the collector to the first zone of the single mixer;
providing a second conduit having a first end in fluid communication with a second sector of the collector and a second end in fluid communication with a second zone of the single mixer, the second conduit adapted to receive and transmit downward at least a portion of the liquid from the second sector of the collector to the second zone of the single mixer,
wherein a geometric center of the first sector of the collector is positioned circumferentially away from a geometric center of the first zone of the single mixer at a first angle relative to a central axis of the inner space of the packed column, and a geometric center of the second sector of the collector is positioned circumferentially away from a geometric center of the second zone of the single mixer at a second angle relative to a central axis of the inner space of the packed column, and
wherein the single mixer has a planar cross-sectional area in a plane perpendicular to the central axis of the inner space of the packed column that is less than a planar cross-sectional area of the inner space of the packed column in the plane perpendicular to the central axis of the inner space of the packed column.

11. A method for assembling an apparatus as in claim 10, wherein the geometric center of the first sector of the collector is positioned circumferentially away from the geometric center of the first zone of the single mixer at a first angle by about 60° to about 180° relative to the central axis of the inner space of the packed column, and wherein the geometric center of the second sector of the collector is positioned circumferentially away from the geometric center of the second zone of the single mixer at a second angle by about 60° to about 180° relative to the central axis of the inner space of the packed column.

12. An apparatus for distributing a flow of a liquid descending in an inner space of a packed column into a packed section, comprising:
a collector having a plurality of sectors disposed in the inner space of the packed column and adapted to collect at least a portion of the flow of the liquid descending in the inner space of the packed column;
a single mixer below and vertically spaced apart from the collector in the inner space of the packed column, and above and vertically spaced apart from the packed section in the inner space of the packed column, the single mixer having a plurality of zones disposed in the inner space of the packed column and adapted to receive and mix at least a portion of the liquid collected on the collector;
a first conduit having a first end in fluid communication with a first sector of the collector and a second end in fluid communication with a first zone of the single mixer, the first conduit adapted to receive and transmit downward at least a portion of the liquid from the first sector of the collector to the first zone of the single mixer; and
a second conduit having a first end in fluid communication with a second sector of the collector and a second end in fluid communication with a second zone of the single mixer, the second conduit adapted to receive and transmit downward at least a portion of the liquid from the second sector of the collector to the second zone of the single mixer,
wherein a geometric center of the first sector of the collector is angularly offset from a geometric center of the first zone of the single mixer by a first angle relative to a central axis of the inner space of the packed column, and a geometric center of the second sector of the collector is angularly offset from a geometric center of the second zone of the single mixer by a second angle relative to a central axis of the inner space of the packed column.

13. An apparatus as in claim 12, wherein the geometric center of the first sector of the collector is angularly offset from the geometric center of the first zone of the single mixer by the first angle of about 60° to about 180° relative to the central axis of the inner space of the packed column.

14. An apparatus as in claim 13, wherein the geometric center of the second sector of the collector is angularly offset from the geometric center of the second zone of the single mixer by the second angle of about 60° to about 180° relative to the central axis of the inner space of the packed column.

15. An apparatus as in claim 12, wherein a planar cross-sectional area of the single mixer in a plane perpendicular to the central axis of the inner space of the packed column occupies no more than about 25% of a planar cross-sectional area of the inner space of the packed column in a plane perpendicular to the central axis of the inner space of the packed column.

\* \* \* \* \*